(12) United States Patent  (10) Patent No.: US 9,053,309 B2
Avni et al.  (45) Date of Patent: Jun. 9, 2015

(54) BEHAVIOMETRIC SIGNATURE AUTHENTICATION SYSTEM AND METHOD

(71) Applicant: Applied Neural Technologies, Limited, Tortola (VG)

(72) Inventors: Yossi Avni, Caesarea (IL); Eytan Suchard, Kiryat Bialik (IL)

(73) Assignee: Applied Neural Technologies Limited (VG)

( * ) Notice: Subject to any disclaimer, the term of this patent is extended or adjusted under 35 U.S.C. 154(b) by 278 days.

(21) Appl. No.: 13/831,140

(22) Filed: Mar. 14, 2013

(65) Prior Publication Data

US 2014/0283005 A1  Sep. 18, 2014

(30) Foreign Application Priority Data

Mar. 14, 2013 (GB) .................................. 1304605.7

(51) Int. Cl.
G06F 7/04 (2006.01)
G06F 21/32 (2013.01)
G06F 21/64 (2013.01)

(52) U.S. Cl.
CPC ................ *G06F 21/32* (2013.01); *G06F 21/64* (2013.01); *G06F 2221/2113* (2013.01)

(58) Field of Classification Search
CPC . H04L 9/0866; H04L 9/3281; H04L 63/0861; G06F 21/32
See application file for complete search history.

(56) References Cited

U.S. PATENT DOCUMENTS

| 4,495,644 A | 1/1985 | Parks et al. |
|---|---|---|
| 5,402,492 A | 3/1995 | Goodman et al. |
| 5,434,928 A | 7/1995 | Wagner et al. |
| 5,828,772 A | 10/1998 | Kashi et al. |
| 6,307,955 B1 | 10/2001 | Zank et al. |
| 6,661,908 B1 | 12/2003 | Suchard et al. |
| 6,687,390 B2 | 2/2004 | Avni et al. |
| 6,735,336 B2 | 5/2004 | Avni et al. |

(Continued)

FOREIGN PATENT DOCUMENTS

| BE | 1012936 A6 | 6/2001 |
|---|---|---|
| CA | 1049146 A2 | 2/1979 |

(Continued)

OTHER PUBLICATIONS

International Search Report and Written Opinion for Application No. PCT/IB2014/000354 dated Aug. 7, 2014.
International Search Report and Written Opinion for Application No. PCT/IB2014/000362 dated Nov. 12, 2014.

(Continued)

*Primary Examiner* — Shewaye Gelagay
*Assistant Examiner* — Khoi Le
(74) *Attorney, Agent, or Firm* — Lerner, David, Littenberg, Krumholz & Mentlik, LLP

(57) ABSTRACT

The present invention discloses a method of verifying the authenticity of a provided signature, comprising the steps of: receiving a set of sampled data points, each sampled data point being associated with a different position along the signature; identifying a set of characterizing nodes within the set of sampled data points using a set of predetermined characterizing nodes comprised in a pre-stored user profile; determining if each identified characterizing node lies within a predetermined threshold range of a corresponding predetermined characterizing node; and generating a positive verification when the characterizing nodes lie within the predetermined threshold range. A system arranged to carry out the method is also disclosed.

46 Claims, 6 Drawing Sheets

(56) References Cited

U.S. PATENT DOCUMENTS

| | | |
|---|---|---|
| 6,912,658 B1 | 6/2005 | Glogau et al. |
| 6,950,538 B2 | 9/2005 | Suchard et al. |
| 6,985,610 B2 | 1/2006 | Suchard et al. |
| 7,054,470 B2 * | 5/2006 | Bolle et al. .................... 382/124 |
| 7,424,462 B2 | 9/2008 | Avni et al. |
| 7,715,600 B2 | 5/2010 | Avni et al. |
| 2003/0138135 A1 * | 7/2003 | Chung et al. ................. 382/119 |
| 2004/0017926 A1 | 1/2004 | Tonisson |
| 2004/0136562 A1 | 7/2004 | Sarraf et al. |
| 2005/0036651 A1 | 2/2005 | Wen |
| 2005/0179923 A1 | 8/2005 | Sojian et al. |
| 2007/0250920 A1 | 10/2007 | Lindsay |
| 2007/0292002 A1 | 12/2007 | Kaplan |
| 2008/0320588 A1 | 12/2008 | Lipetz |
| 2009/0268940 A1 | 10/2009 | Kunieda |
| 2009/0328143 A1 | 12/2009 | Ming |
| 2010/0063922 A1 | 3/2010 | Evans |
| 2010/0225443 A1 | 9/2010 | Bayram et al. |

FOREIGN PATENT DOCUMENTS

| | | |
|---|---|---|
| DE | 19907251 A1 | 8/2000 |
| DE | 19930908 A1 | 1/2001 |
| EP | 0782090 A2 | 7/1997 |
| EP | 0950992 A2 | 10/1999 |
| EP | 1280098 A1 | 1/2003 |
| GB | 2259391 A | 3/1993 |
| GB | 2335767 B | 4/2003 |
| WO | 03009217 A1 | 1/2003 |
| WO | 2004038532 A2 | 5/2004 |
| WO | 2005027502 A1 | 3/2005 |
| WO | 2007127038 A2 | 11/2007 |

OTHER PUBLICATIONS

Munich M E et al: "Continuous dynamic time warping for translation-invariant curve alignment with applications to signature verification"?Computer Vision?1999, The Proceedings of the Seventh IEEE Internation Al Conference on Kerkyra?Greece Sep. 20-27, 1999? Los Alamitos? CA? USA?IEEE Comput. SOC? US?vol. 1?Sep. 20, 1999 ?pp. 108-115?XP010350401?.

Wikipedia, "Digital Watermarking", <http://en.wikipedia.org/wiki/Digital_watermarking>, last modified Nov. 7, 2013.

Wikipedia, "Steganography", <http://en.wikipedia.org/wiki/Steganography>, last modified Nov. 8, 2013.

Search Report for Application No. GB1304602.4 dated Sep. 30, 2013 (claims 1-55).

Search Report for Application No. GB1304605.7 dated Sep. 30, 2013 (claims 1-26).

Search Report for Application No. GB1304605.7 dated Dec. 9, 2013 (claims 27-36).

Search Report & Written Opinion for Application No. GB1304603.2 dated Sep. 4, 2013 (claims 1&13).

Search Report for Application No. GB1304603.2 dated Dec. 5, 2013 (claims 61&71).

Search Report for Application No. GB1304603.2 dated Dec. 5, 2013 (claim 50).

Search Report for Application No. GB1304603.2 dated Nov. 29, 2013 (claims 48&49).

Search Report for Application No. GB1304603.2 dated Nov. 25, 2013 (claim 56).

Search Report for Application No. GB1304603.2 dated Nov. 27, 2013 (claims 40&44).

Search Report for Application No. GB1304603.2 dated Nov. 25, 2013 (claims 19, 36 & 37).

* cited by examiner

BEHAVIOMETRIC SIGNATURE AUTHENTICATION SYSTEM AND METHOD

CROSS-REFERENCE TO RELATED APPLICATIONS

The present application claims priority from GB Pat. App. No. 1304605.7 filed Mar. 14, 2013.

FIELD OF INVENTION

The present invention relates to biometric security systems, and in particular to a behaviometric signature verification system and method, that may be used for identification authentication purposes.

BACKGROUND OF INVENTION

Biometric authentication refers to the identification of humans by their characteristics or traits. Biometric identifiers are often categorised as physiological or behavioural. Physiological biometric identifiers relate to unique identifiers associated with an individual human's physiology. DNA and fingerprints are examples of such physiological biometric identifiers. Behavioural biometric identifiers relate to an individual's behaviourisms, such as gait and voice. The field of behavioural biometrics is commonly referred to as behaviometrics.

Historically signatures have been used to authenticate documents. The presence of the signature on a document is interpreted as an indication that the signee adopts the intentions and/or terms set out in the document. For example, the presence of an individual's signature on a legal document, such as a lease, indicates that the individual is bound by the legal clauses set out in the document. A signature may comprise one or more symbols, or other distinctive markings, associated with the identity of the person drawing the symbols and/or markings, such as a stylized script of letters that may spell the person's name. The authenticity of the provided signature may be verified by comparing it to a template signature for consistency. This may effectively be an image comparison process, which seeks to determine whether the provided signature and the template signature are sufficiently similar in appearance. Any visual discrepancies may be indicative of a fraudulent signature.

Existing identity verification processes (also referred to as signature verification processes) often rely on signature verification and can be relatively insecure. For example, in order to compensate for a human's inability to reproduce identical graphical copies of their signature, the image comparison is approximate, which can limit the accuracy of the signature verification process. The confirmation of identity is thus approximate and based on the image comparison. In addition, many known signature verification processes are susceptible to fraudulent users, as it is relatively straightforward for an expert forger to graphically reproduce a visually-similar signature that is capable of generating a false positive verification result. For these reasons, many documents and/or transactions would benefit from a more robust and secure form of identification verification. For example, in the case of high value documents and/or high value transactions, often the presence of a trusted third party vouching for the identity of the signee is required—one of the functions of a notary public—and/or alternative identification verification means are required.

Due to the ever growing use of electronic communication, there are also systems that provide an electronic equivalent of the traditional signature and use digital means to validate a user's identity on the basis of a provided signature.

A commonly implemented method of digital identity verification relates to the use of a password/passcode, in which a unique, confidential alphanumeric code is used to uniquely identify a person to a system. Such verification systems are often inconvenient since they require that the user remember their unique alphanumeric identification code. The security of such systems is also dependent on the maintained confidentiality of the identification code.

Certain existing electronic signature verification systems suffer from several shortcomings which limit their practical utility in identification verification systems, and compromise the level of security provided. Such systems operate by comparing a user's received signature with a user's pre-stored signature template. This comparison process is commonly an image comparison process, wherein geometric similarities are identified. Such verification systems analyse the provided signature for the presence of specific geometric objects present in the template signature. Various object matching techniques may be used. A positive signature verification result is returned where any identified geometrical discrepancies between the signatures lie within a predetermined and allowable threshold value. Otherwise, a failed verification result is returned. This verification process is often an approximate statistical process, which analyses the statistical graphical similarity between a reference signature (the template signature) and a provided signature by identification of geometrically similar objects present in both signatures.

Electronic signature verification systems that are reliant on a statistical analysis of the graphical similarities between signatures may be susceptible to fraud by expert forgers capable of generating signature forgeries that are visually sufficiently similar to the signature template. Therefore, when used as security devices, known electronic signature verification systems provide a limited level of security.

Different embodiments of the present invention have different objects, but at least one object of one embodiment is to provide a more robust electronic signature verification method and system using behaviometrics, which may be used for digital identification purposes, and mitigates at least some of the shortcomings of existing electronic signature verification systems.

SUMMARY OF INVENTION

The following summary relates to just some of the potential configurations and operations of the present invention.

In one aspect, a system and method uses behaviometric user information to verify the authenticity of a provided signature. This is achieved by deriving behaviometric user information from the provided signature and comparing the derived behaviometric information with a user's pre-stored behaviometric signature template. The pre-stored behaviometric signature template is comprised of a behaviometric signature data that was previously derived from a user's signature.

The signature may be verified as sufficiently likely to have been drawn by a particular user when the behaviometric information associated with the signature to be tested is sufficiently similar to the behaviometric signature data pre-stored in the user's signature template. For example, a positive verification result may be returned when the similarities between the behaviometric information derived from the signature to be tested are within an acceptable range of the behaviometric signature data pre-stored in the user's signature template.

In one aspect, a method is provided of verifying the authenticity of a provided signature, the method including: receiving a set of sampled data points, each sampled data point being associated with a different position along the signature; identifying a set of characterising nodes within the set of sampled data points using a set of predetermined characterising nodes comprised in a pre-stored user profile; determining if each identified characterising node lies within a predetermined threshold range of a corresponding predetermined characterising node; and generating a positive verification when the characterising nodes lie within the predetermined threshold range.

In certain aspects, use of a predetermined threshold range may improve the practical utility of the method by compensating for discrepancies present in different received signature iterations (i.e. different copies of the same signature) arising from a user's inability to reproduce identical graphical copies of their signature time after time. In other words, this feature compensates for discrepancies inherent in different provided signature iterations.

In certain aspects of the invention, each sampled data point comprises a time component represented by a time coordinate value, and the receiving step comprises for each sampled data point: calculating a time interval between the sampled data point and an adjacently located sampled data point, by comparing the time coordinate values associated with respectively the sampled data point and the adjacently located sampled data point; determining if the time interval lies within a predetermined time interval threshold value and interpolating the position and time coordinate of one or more further data points located between the sampled data point and the adjacently located sampled data point when the calculated time interval exceeds the predetermined time interval threshold value, the interpolated position being selected such that the time interval between the sampled data point and the interpolated time coordinate associated with the one or more further data points lies within the predetermined time interval threshold value. The temporal interval of separation between adjacent sampled data points may be considered sufficiently small when it is likely that the set of received sampled data points is sufficient to accurately define the associated signature, which signature may mathematically be represented by a function. Interpolation may subsequently be used to complement sets of received sampled data points that are considered incomplete. This can improve the practical utility of the present method, since a received incomplete set of sampled data points may be salvaged and used for verification purposes.

The receiving step may comprise: calculating a distance of separation between a sampled data point and an adjacently located sampled data point; determining if the distance of separation between the sampled data point and the adjacently located sampled data point lies within a predetermined distance interval threshold value; and interpolating the position of one or more further data points located between the sampled data point and the adjacently located sampled data point, when the calculated distance of separation exceeds the predetermined distance interval threshold value, such that the distance of separation between the sampled and the interpolated position associated with the one or more further data points lies within the predetermined distance interval threshold value. The distance interval of separation between adjacent sampled data points may be sufficiently small to determine that the set of received sampled data points is likely sufficient to accurately define the associated signature. Interpolation may subsequently be used to complement a set of received sampled data points that is determined to be incomplete. This may allow an incomplete set of received sampled data points to be salvaged and used for verification purposes.

The identifying step may comprise obtaining the set of predetermined characterising nodes contained in the pre-stored user profile, and identifying the sampled data point which is most correlated with each predetermined characterising node from the set of sampled data points, using optimization matching. Optimization matching matches the predetermined characterising nodes with sampled data points, even where the set of sampled data points was sampled with a different sampling frequency than the predetermined characterising nodes. The optimization matching may not require either uniform sampling rate or the emulation of such rates by a pre-processing step.

Each sampled data point may be associated with a visible portion of the signature and each characterising node may be represented by a vector comprising a time component and a spatial component, the spatial component being indicative of a relative position of the vector along the signature.

The optimization matching may comprise: selecting a first predetermined characterising node from the set of predetermined characterising nodes; calculating a vector dot product value between the selected first predetermined characterising node and each sampled data point within the set of sampled data points; identifying the sampled data point associated with the largest vector dot product value as the data point that is most correlated with the first predetermined characterising node, and designating the sampled data point as a characterising node comprised within the set of identified characterising nodes; and repeating the previous steps for each predetermined characterising node. The most correlated sampled data point is the data point which is oriented in substantially the same direction as the predetermined characterising node, such that an angle of divergence $\theta_j$ between the two vectors associated with respectively the predetermined characterising node and the sampled data point is minimised.

The optimization matching may comprise using a matching function $M_j$ to identify the sampled data point which is most correlated with the predetermined characterising node, the matching function being a function of three differentiable functions $F(\theta_j)$, $G(d_j, d_{j+1})$, and $Q(r_j * d_j)$, where the following definitions apply:

$\theta_j$ is the angle formed between the vector associated with the predetermined characterising node and the vector associated with the sampled data point;

$r_j$ is the scalar component of the vector associated with the predetermined characterising node;

$d_j$ is the scalar component of the vector associated with the sampled data point;

$d_{j+1}$ is the scalar component of the vector associated with an adjacent sampled data point;

$F(\theta_j)$ and $G(d_j, d_{j+1})$ are positive and have an upper positive value; and $Q(r_j * d_j)$ is a convex function selected such that whilst it is monotonically increasing, its derivative monotonically decreases to zero.

The method may further comprise: selecting a first one of the identified characterising nodes; calculating a geometric relationship of the selected first characterising node with respect to one or more adjacently located identified characterising nodes; the determining step may comprise verifying if each calculated geometric relationship lies within a predetermined threshold value range comprised in the pre-stored user profile; and wherein a positive verification result is generated when one or more calculated geometric relationships lie within the predetermined threshold value range. This typically indicates that geometrical relationships present between the predetermined characterising nodes are present in the received set of sampled data points, and can improve the accuracy of the signature verification process. In particular, if a geometrical relationship associated with an identified characterising node is inconsistent with a predetermined threshold value range, then this may be indicative of a fraudulent signature. This feature can also provide a means for determining the accuracy of the optimization matching process. If the identified characterising node does not display the expected geometric relationship, then this may be indicative that a different sampled data point may be a better match with the predetermined characterising node.

The geometric relationship may be calculated between the identified characterising node and each one of two adjacent, sequentially-located identified characterising nodes, in order to define two different geometric relationships associated with the identified characterising node. The geometric relationship may also be calculated between the identified characterising node and each one of seven adjacent, sequentially-located identified characterising nodes, in order to define seven different geometric relationships associated with the identified characterising node. In general, the more the geometrical relationships that are analysed, the more accurate the verification process. However, this improved accuracy increases processing requirements and in certain applications where available processing resources are limited, it may not be feasible to analyse a large number of geometrical relationships. The calculation of seven geometric relationships may provide a good balance, improving the accuracy of the verification process, whilst not unduly increasing processing requirements, permitting the present method to be implemented on a myriad of different apparatus having different processing capabilities.

In some embodiments, the calculation of the geometric relationships is carried out twice using a different number of identified characterising nodes. In the first case, the number of identified characterising nodes m is selected to be less than or equal to half the number of sampled data points n:

$$m \leq \frac{n}{2}$$

In this way, the calculated geometric relationships may be used to determine if local geometric relationships are maintained within the set of sampled data points associated with the provided signature being verified. In the second case, the number of identified characterising nodes m is less than or equal to a quarter the number of sampled data points n:

$$m \leq \frac{n}{4}$$

Since the characterising nodes are associated with sampled data points that are preferably evenly spaced along the entire length of the provided signature, this lower density selection of characterising nodes can be used to determine if global geometric relationships are sufficiently maintained within the set of sampled data points. Analysis of the presence of both global and local geometric relationships within the received set of sampled data points may improve the accuracy of the verification process.

The method may comprise sampling the provided signature with a variable sampling rate, such that at least a portion of the sampled data points in the set of received sampled data points are associated with different sampling rates. The method may further comprise generating a hash value on the basis of the set of sampled data points; comparing the generated hash value with a set of pre-stored hash values to determine if the generated hash value is unique; and wherein a positive verification result is generated when the generated hash value is unique. The hash value may be helpful in mitigating against relay attacks (also referred to as man-in-the-middle attacks) where, for example, data associated with a previously provided signature is recycled. When at least a portion of the sampled data points contained in the set of received sampled data points are associated with different sampling rates, each received set of sampled data points is typically unique relative to other sets. The uniqueness of the set of sampled data points typically results in the hash value generated from the unique sampled data points also being unique. If the comparison reveals that the hash value associated with a set of received sampled data points is not unique, then this is indicative of a previously received set of sampled data points being recycled, in which case a negative verification result may be returned.

The sampling step may include normalising the provided signature, which may mitigate effects of scale between provided signatures.

The method may further comprise calculating a lapsed time interval between each identified node; determining if the calculated time lapse value lies within a predetermined threshold value range comprised in the pre-stored user profile; and generating the positive verification result when the calculated time lapse value lies within the predetermined threshold value range. Since a signature is typically associated with a rehearsed movement which is second nature to the authorised user, the time taken to generate an authentic signature is expected to fluctuate only slightly between different provided signature iterations. Therefore an analysis of the lapsed time intervals between different parts of the signature may provide a good metric for verifying the authenticity of the provided signature, and specifically whether the genuine user generated the signature.

The method may also comprise calculating a velocity vector for each identified characterising node, using spatial coordinates and a temporal coordinate associated with each characterising node; determining if each calculated velocity vector lies within a predetermined threshold value range comprised in the pre-stored user profile; and generating the positive verification result when the calculated velocity vectors lie within the predetermined threshold value range. The velocity vector may provide a suitable way of capturing behaviometric user movement information that is associated with the provided signature. Accordingly, by analysing the velocity vectors, it is possible to determine a value indicative of the likelihood if the provided signature being generated by the genuine user.

The method may also comprise calculating an acceleration vector for each identified characterising node, using spatial coordinates and a temporal coordinate associated with each characterising node; determining if each calculated acceleration vector lies within a predetermined threshold value range associated with the pre-stored user profile; and generating the positive verification result when the calculated acceleration vectors lie within the predetermined threshold value range. The acceleration vector provides another way of capturing behaviometric user movement information that is associated with the provided signature. By analysing the acceleration vector it is therefore possible to determine if the provided signature was generated by the genuine user. (References herein to a processor or other automated system determining if a signature is authentic, was actually generated by the expected user, or similar variants thereof will be understood to refer to determining a value that is associated with the likelihood that the provided signature was written by the same user as the user associated with the previously-received signature, e.g., the signature-related information stored in a user profile. Such value may be, by way of example, a binary value such as "true" or "false" (e.g., a positive or negative verification result), a floating point number (e.g., a number between 0 and 1 that is indicative of the percentage likelihood that the users are the same) or another value or set of values related thereto such as, by way of example only, combinations of the foregoing (e.g., returning a positive result when a calculated set of floating numbers exceeds a one or more thresholds that may be set or dynamically determined).)

The method may comprise calculating first order and second order derivatives associated with line segments present between adjacent sampled data points comprised in the set of sampled data points; defining a geometrical complexity rating of the provided signature on the basis of the calculated first and second order derivatives; and rejecting the received signature when the defined geometrical complexity rating is below a minimum predetermined required geometrical complexity rating threshold. In that regard, an automated way may be provided for determining if a sufficient amount of behaviometric information can be derived from the signature. The amount of behaviometric information that is derivable from a signature will in part be dependent on the geometric complexity of the signature. In this sense, the behaviometric information content of a signature may be at least in part dependent on the geometrical complexity of the signature. The more geometrically complex a provided signature is, the more likely it is that behaviometric information may be derived therefrom and therefore the easier it may be to distinguish the signature from fraudulent copies thereof. The sufficiency of the geometrical complexity of the provided signature for behaviometric verification purposes may also be determined. In some aspects, the provided signature may be required to meet different complexity ratings depending on the level of required security.

In some aspects, the system and method may comprise maintaining a record of characterising node values that resulted in positive verification results, the characterising node values being associated with a plurality of different received sets of sampled data points associated with different copies of the same signature; calculating a statistical variance between the characterising node values and the corresponding predetermined characterising nodes for each different provided copy of the same signature; and amending the predetermined threshold value range of the corresponding predetermined characterising node to be consistent with the calculated statistical variance. The statistical variance may be calculated using the characterising node values that resulted in positive verification results associated with different copies of the same signature provided over the course of a time period. In this way, the magnitude of the predetermined threshold value range may be dynamically determined based on the consistency with which the user is able to reproduce their signature, and may change if the user's consistency slowly changes over time. This information may be used to keep the user's pre-stored profile up-to-date.

Another aspect relates to a system for verifying the authenticity of a provided signature, arranged to carry out the methods described herein. Specifically, the system may comprise: an input device arranged to receive a set of sampled data points, each sampled data point being associated with a different position along the signature, and a processor. The processor may be arranged to: identify a set of characterising nodes within the set of sampled data points using a set of predetermined characterising nodes contained in a pre-stored user profile; determine if each identified characterising node lies within a predetermined threshold value range of a corresponding predetermined characterising node; and generate a positive verification result when the characterising nodes lie within the predetermined threshold value range.

In certain aspects, the signature input device and the processor used to determine the authenticity of the inputted signature may be contained in separate devices. The input device and processor may also be at different nodes of a network. For example, such a processor may be contained in a server located remotely to the input device, and the server may be operatively coupled to the input device via a communication channel. The input device may comprise a touch-pad or a touch-sensitive screen arranged to receive a signature. The method may be used to authorise a transaction between two remotely located entities.

The input device may also comprise a mobile telephone provided with a touch-sensitive screen. In this way, a user can use the mobile telephone's touch-sensitive screen to provide their signature to the processor for subsequent verification. For example, the processor may be comprised in a remotely located server. The input may comprise a personal computer, or a tablet computer, arranged to receive a user's signature.

The system may be used to control access to a secure resource, such as controlling remote access to a user's bank account. For example, the system and method may be used as identification verification means for use in internet banking.

The system may be used to control a transaction between two remotely located entities. For example, where the transaction relates to a financial transaction the present system may be used as an intermediary to verify and confirm the payee's and/or recipient's identity. For example, the system may relate to a server provided as an intermediary between the payee and the recipient, and arranged to verify the authenticity of a set of sampled data points associated with either the payee's or the recipient's signature.

Systems in accordance with the present invention include \a mobile telephone, a personal computer, and a tablet, all of which may be used or otherwise arranged in accordance with the present invention.

FIGURES

Various embodiments of the invention are now described with reference to the following figures, in which.

DESCRIPTION OF INVENTION

The present invention relates, amongst other things, to a system and method for verifying behavioural biometric information derived from a user's signature.

Figure 1:
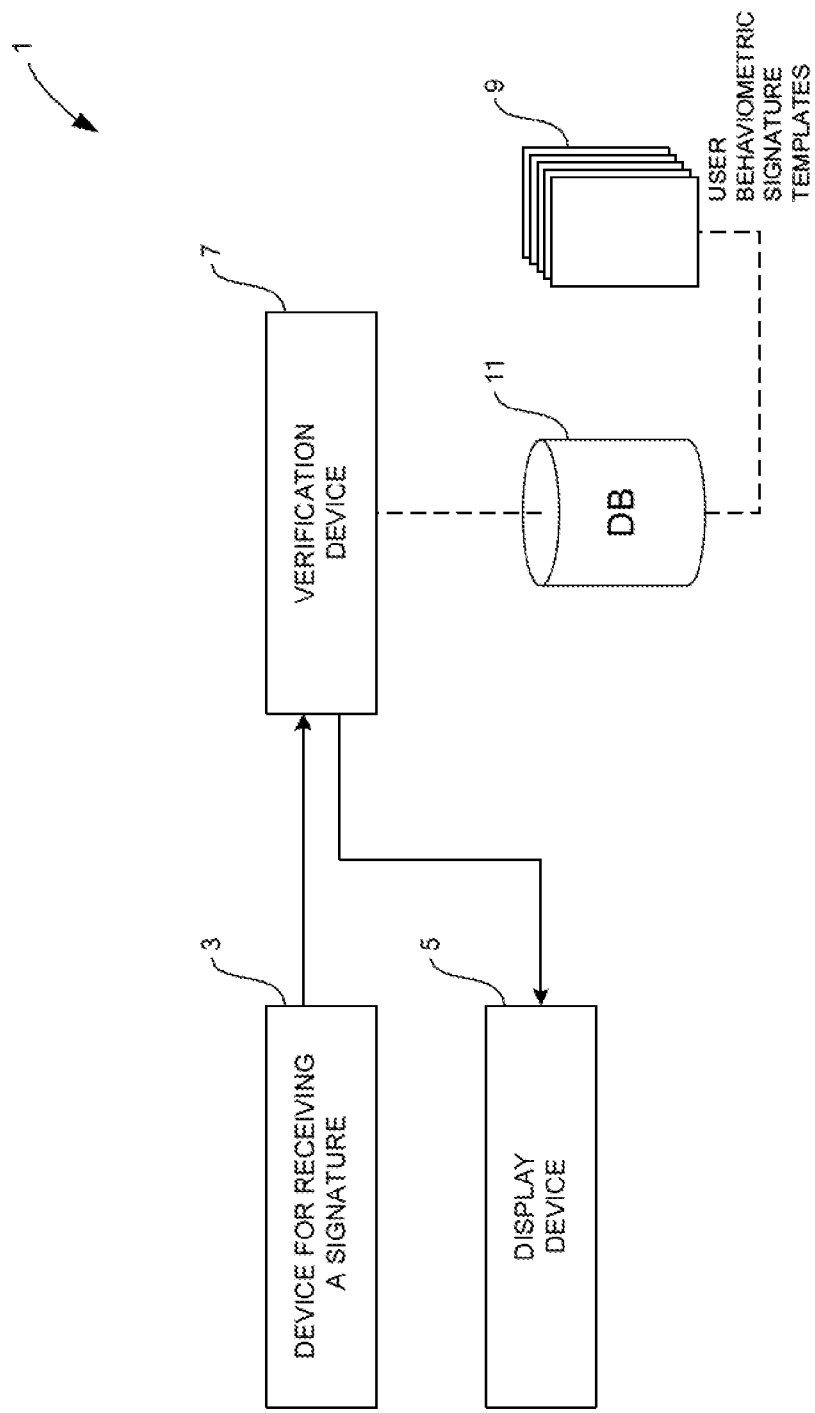
FIG. 1 is an example of a system arranged to carry out the signature verification method.

FIG. 1 is a schematic illustration of one example of a behaviometric signature verification system 1 arranged to implement the present method. The system 1 comprises a device 3 suitable for receiving a signature, which device 3 will be referred to as a signature entry device in the following discussion; a display device 5, and a verification device 7. The signature entry device 3 may relate to any apparatus in which a user may provide a signature, and which is configured to monitor and record the time taken to receive the signature in addition to recording the stylised script associated with the signature, whilst it is being generated by the user. The display device 5 may be configured to display visual cues and/or instructions to the user for entering their signature, in addition to displaying signature verification results. For example, the display device 5 may be configured to display instructions instructing the user when to begin entering their signature on the signature entry device 3.

The verification device 7 is configured to verify the authenticity of the provided signature by analysing the signature, and specifically behaviometric information derived therefrom, and comparing this information with a user's pre-stored behaviometric signature template 9, which is stored in a database 11. The database 11 is operatively coupled to the verification device 7, providing the verification device 7 with access to the pre-stored biometric signature template 9.

The signature entry device 3 and the verification device 7 may each comprise a processor, memory and may include other components typically present in such devices and general purpose computers. In one example, each memory may store information accessible by the device's processor, including instructions that may be executed by the processor. The memory may also include data that may be retrieved, manipulated or stored by the processor. The memory may be any type of medium capable of storing information accessible by the processor, such as a hard-drive, memory card, DVD, and/or write-capable and read-only memories. The processor may be any conventional processor, including general processing units and Reduced Instruction Set Computing ("RISC") processors. Alternatively, the processor may be a dedicated controller such as an ASIC.

The instructions may be any set of instructions to be executed by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Although signature entry device 3 and verification device 7 may each contain their own processor, each device's processor and memory may contain multiple processors and memories that may or may not be stored within the same physical housing. For example, some of the instructions and data may be stored on removable media and others within a read only computer chip. Some or all of the instructions and data may be stored in a location physically remote from, yet still accessible by, the processor. Similarly, the processor may actually contain a collection of processors which may or may not operate in parallel. Yet further, even if signature entry device 3 is at a remote location relative to verification device 7, signature entry device 3 may contain a screen and touch-sensitive surface and little other logic circuitry, such that the input at the signature entry device 3 is sent to the processor of verification device 7 for processing and video signals of the information to be displayed may be sent by the verification device 7 to the display device 5.

The data may be retrieved, stored or modified by processor in accordance with the instructions. For instance, although the invention is not limited by any particular data structure, the data may be stored in computer registers, in a relational database as a table having a plurality of different fields and records, XML documents, or flat files. The data may also be formatted in any computer-readable format such as, but not limited to, binary values or Unicode. The data may contain any information sufficient to identify the relevant information, such as numbers, descriptive text, proprietary codes, pointers, references to data stored in other memories (including other network locations) or information that is used by a function to calculate the relevant data. In some embodiments any one or more of the signature entry device 3, the display device 5, and the verification device 7 may be contained within the same physical device. Alternatively, any one or more of the signature entry device 3, the display device 5, and the verification device 7 may be contained in separate physical devices, in which case the devices are arranged to communicate with each other via one or more communication channels.

The behaviometric signature verification system 1 may be deployed as an identification verification device. For example, the system 1 may be used to control access to a secure facility by controlling operation of a gate or a door, or it may be used to control access to a secure device, such as a smartphone, tablet computer or similar device. The signature entry device 3 may relate to a touch-sensitive pad configured to detect finger gestures, whereas the display device 5 may relate to an LCD screen.

Considering the aforementioned example where the system 1 is implemented to control access to a secure facility, upon receiving a user request to open the gate or door, the display device 5, which may relate to an LCD screen, may be configured to display instructions instructing the user to provide their signature in the appropriate signature entry device 3, which may relate to the aforementioned touch-sensitive pad. Whilst the signature is entered onto the touch-sensitive pad, both the finger trace (which relates to the stylized script of the signature) on the pad and the time required to enter the signature are recorded. The provided signature is analysed and forwarded to the verification device 7 for comparison with the user's pre-stored biometric signature template 9. The signature analysis comprises analysing and deriving behaviometric information from the provided signature (e.g., the signature that was entered by the user, whose authenticity will be determined). This may be carried out at either the signature entry device 3, processing power permitting, or at the verification device 7. The analyses may be carried out in real-time, whilst the signature is being entered, or it may be analysed after the entire signature has been provided.

The verification device 7 compares the derived behaviometric information with the user's pre-stored behaviometric template to determine if the behaviometric information derived from the provided signature is consistent with the user's behaviometric template. The verification results may be subsequently displayed on the display device 5.

Figure 2:
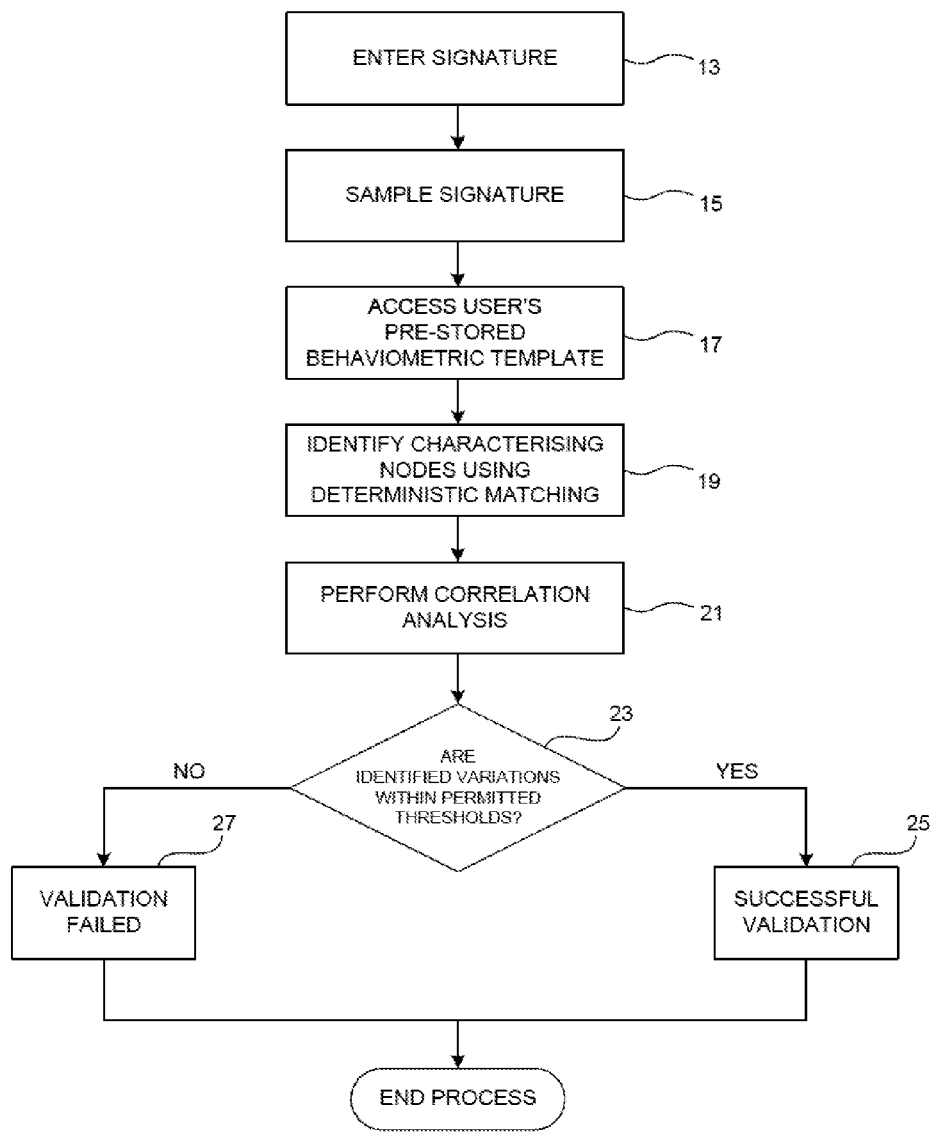
FIG. 2 is a process flow chart outlining the steps comprised in the signature verification method, which may be executed on the exemplary system of FIG. 1.

FIG. 2 is a process flow chart which outlines the different steps comprised in a behaviometric signature verification method that may be carried out, for example, using the system of FIG. 1. A signature 29, such as the signature illustrated in FIG. 3a is provided on a signature entry device 3, at step 13. This may be initiated, as mentioned previously, by the display of a visual cue on the display device 5 instructing the user to provide their signature. The provided signature is sampled and may be normalised, at step 15.

Normalisation is used to address potential differences of scale between different provided iterations of the same signature, and helps to ensure accuracy of derived behaviometrics. For example, and as will be described in further detail below, the user's behaviometric signature template 9 is generated during an enrolment process, wherein one or more copies (also referred to as signature iterations herein) of a user's signature are provided and relevant behaviometric information derived therefrom. The signatures may be normalised to mitigate for differences in physical scale between the different provided signature iterations. This can help to ensure that derived behaviometric information is independent of differences in physical scale between the different provided signature iterations. During subsequent signature verification, signature normalisation can help ensure accuracy by minimising the false reject rate.

The user's associated behaviometric signature template 9 is identified and accessed at step 17. The relevant behaviometric signature template 9 may be identified by requiring entry of a user identifier during the signature entry step 13. Once provided with the user identifier, identification of the relevant behaviometric signature template 9 may be carried out by the verification server 7. The identifier may relate to an alphanumeric code, a name or any other identification means. The identifier may be provided by the user on the signature entry device 3. Similarly, the signature entry device 3 may comprise a touch-sensitive keyboard such as present in most touch-screen equipped smart mobile telephones, such as the iPhone®.

Alternatively, the behaviometric signature verification system 1 of FIG. 1 may be provided with an additional keyboard (not shown in FIG. 1) for providing a user identifier. In this way the user can provide their identifier, and the verification device 7 is able to identify the relevant user behaviometric signature template 9, at step 17.

The user's behaviometric signature template 9 may comprise a set of characterising nodes, which relate to a plurality of pre-selected data points located on the stylized script of the user's signature. The characterising nodes are used during the signature verification process to identify the sampled data points located on the provided signature, which best correspond with the characterising nodes comprised in the user's behaviometric signature template 9. Deterministic matching is used, at step 19, to identify the sampled data points which correspond to the characteristic nodes. The identified sampled data points are also referred to as characterising nodes in the below discussion.

In certain embodiments, the precise stage at which the user's associated behaviometric signature template 9 is identified by the verification server 7 is immaterial. The only requirement may be that the user's behaviometric signature template 9 is identified prior to deterministic matching, at step 19. For example, identification of the user's behaviometric signature template 9 may be carried out prior to signature entry (step 13).

Correlation analysis occurs at step 21, and comprises analysing correlations between the characterising nodes identified on the provided signature, at step 19, and the characterising nodes comprised in the user's behaviometric signature template 9. This comprises identifying statistical variances between the two sets of characterising nodes. Where the statistical variances are determined, at step 23, to lie within permitted predetermined threshold values stored in the user's behaviometric signature template 9, then the verification device 7 returns a successful verification result, at step 25. If the identified statistical variance lies outside permitted predetermined threshold values, then a validation failed result is returned, at step 27. A small magnitude of observed variance between the characterising nodes comprised in the provided signature and in a user's behaviometric signature template 9 is expected, even for a genuine authentic user, due to the inherent inability of the average human to perfectly reproduce their signature each and every time. As a result, each provided signature iteration is expected to deviate slightly from previous iterations, and the system and method may cater to this type of expected variance.

This human characteristic may also be used as an additional security feature. For example, if the correlation analysis results at step 21 display a perfect match with the behaviometric template profile then this may be indicative of a fraudulent signature and for security reasons a failed validation result may be returned, at step 27. A perfect match may be indicative of the instance where the characterising nodes of the provided signature do not have any statistical deviation from the characterising node values defined in the user's behaviometric signature template 9.

Depending on the environment in which the signature verification system 1 is deployed, the verification results may be provided on the display device 5. Where the signature verification system 1 is deployed to control access to a facility, for example, successful verification may result in an optional visual confirmation being displayed on the display device 5, in addition to access to the facility being granted. Any display may be used, e.g., the display may be: a light that turns on when a positive verification is determined, an electronic display, such as a monitor, displaying a customized message, or a mechanical device that physically changes the position of an object such as flipping an object labelled "closed" on one side and "open" on the other.

The above and below described practical implementations of the invention are provided for illustrative purposes only, and are not limiting. The present method and system may be deployed in a myriad of different environments, and these and other variations and combinations of the features discussed above and below can be utilized without departing from the subject matter as defined by the claims. The provision of the examples described herein (as well as clauses phrased as "such as," "e.g.", "including" and the like) should not be interpreted as limiting the claimed subject matter to the specific examples; rather, the examples are intended to illustrate only some of many possible aspects of the present invention.

Furthermore, the physical location of the verification device 7 may be local to the signature entry device 3 or located remotely. For example, where the signature entry device relates to the touchscreen of a smartphone, the verification device 7 may be located local to the smartphone, such that the signature may be verified locally on the smartphone without having to establish data communication with a remotely located verification server. In such embodiments it is envisaged that the smartphone may only store one or more authorised users' behaviometric signature templates locally. A further advantage of such an embodiment is that the signature verification system may be used even in so-called mobile telephone 'black-holes.' In other words, the system may be used in geographical areas suffering from very poor or even absent mobile telephone reception signals. Alternatively, the signature entry device 3 may be a dedicated device at one location, verification device 7 may be a server at another location, database 11 may be contained in a memory at yet another location, and all of the devices communicate with one another over a network, such as a wired local area network (LAN), Wi-Fi network, cellular phone network, or wide area network, such as the Internet. In this regard, the signature entry device 3, verification device 7 and database 11, as well as their individual components, may or may not be contained within the same device or at the same location. Similarly, the display device 5 may or may not be contained within the same device as the signature entry device 3, e.g., the display device 5 may be a separate monitor. By way of alternative example, the display device 5 and signature entry device 3 may be implemented via the same touch-sensitive screen.

As previously mentioned, the user's behaviometric signature template 9 is generated during an initial user enrolment process, which is now described in further detail.

Figure 3C:
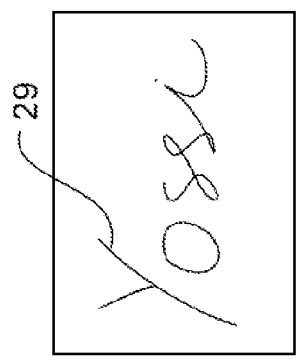
FIGS. 3a, 3b and 3c illustrate the different steps comprised in sampling a provided signature (FIG. 3a), using the system of FIG. 1; the steps comprising sampling the provided signature (FIG. 3b) and identification of characterising nodes (FIG. 3c)
Figure 3B:
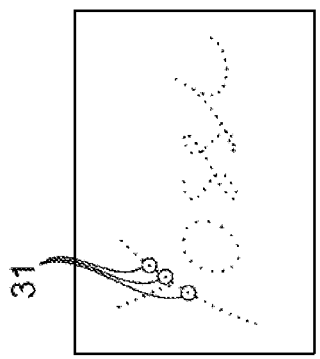
Figure 3A:
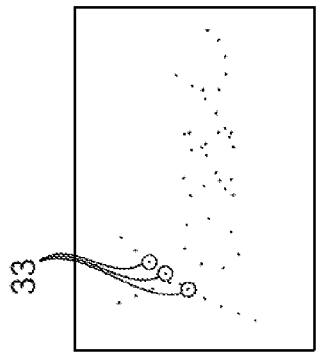

FIGS. 3a, 3b and 3c illustrate different stages comprised in the enrolment process, and specifically illustrate the sampling and characterising node deployment processes. These are described in more detail in relation to FIG. 4 below.

FIG. 3a illustrates a copy of a signature 29 provided at a signature entry device 3, at step 13 of FIG. 2. FIG. 3b illustrates sampled data points 31, as sampled at step 15 of FIG. 2. FIG. 3c illustrates the identification of characterising nodes 33, at step 19 of FIG. 2.

Figure 4:
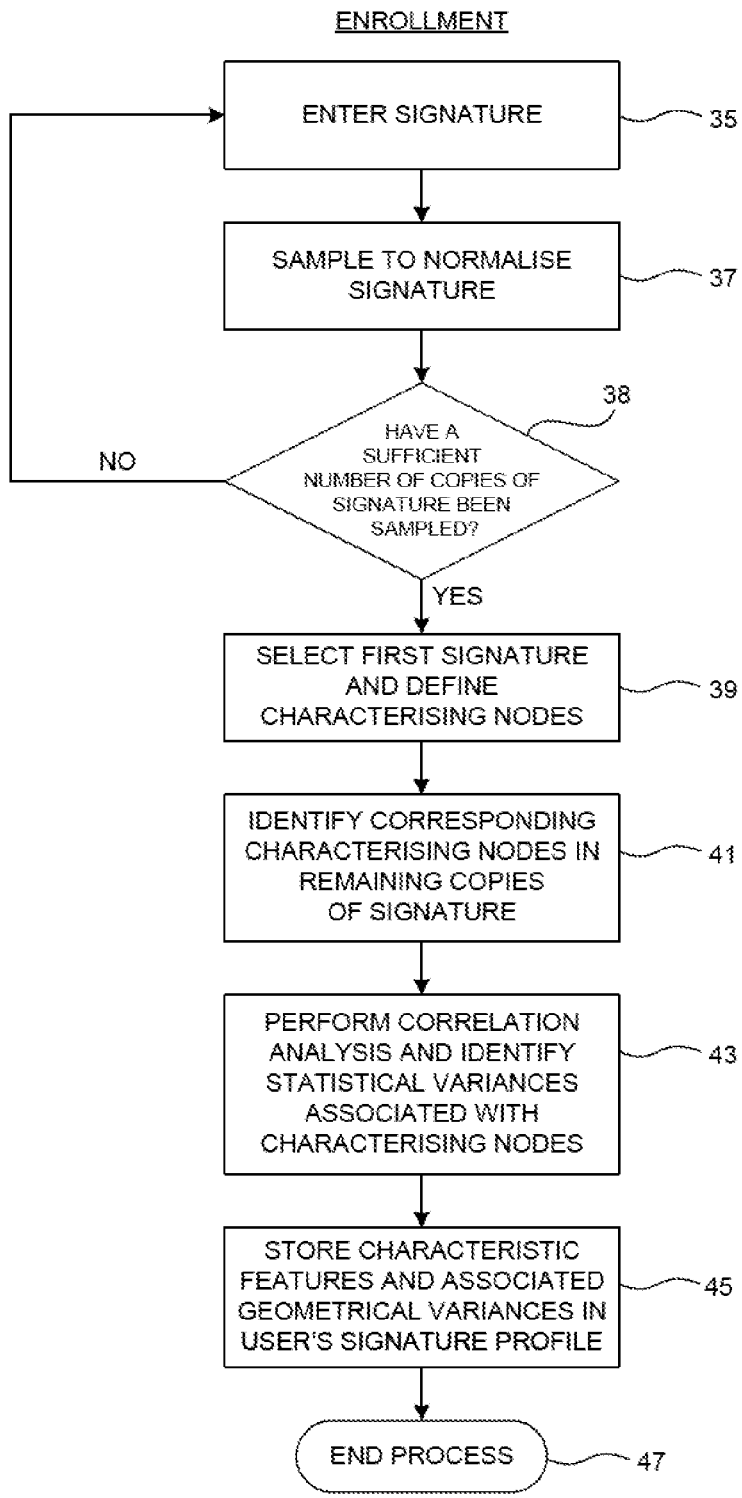
FIG. 4 is a process flow chart outlining the steps comprised in a signature enrolment process, required to generate a user's behaviometric signature template, which may be executed on the exemplary system of FIG. 1.

FIG. 4 is a process flow chart providing an overview of the steps comprised in the enrolment process. The enrolment process may be carried out in the behaviometric signature verification system illustrated in FIG. 1, or in any other similar system comprising at the very least a device 3 for receiving a signature, and a device configured to derive user behaviometric information from the provided signature, such as the illustrated verification device 7.

On initiation of the enrolment process, the user may be required to provide two or more copies of their signature on the signature entry device 3, at step 35. During enrolment two or more iterations (copies) of the same signature may be provided to enable the system to empirically generate statistical tolerance thresholds. These tolerance thresholds improve the practical utility of the signature verification system by reducing the false reject rate. However, tolerance thresholds may be arbitrarily assigned, in which case only a single provided copy/iteration of the signature may be required during enrolment. In order to decrease false reject rates, the which may generate tolerance thresholds customised to each user, on the basis of an empirical analysis. Such calculated tolerance threshold values may at least in part be dependent on an analysis of how consistent the user is in reproducing their signature, such that two or more signatures may be required during enrolment. The behaviometric signature template associated with a user displaying a high level of consistency may have smaller tolerance thresholds compared with a user displaying a lower level of consistency, since for the former a lower degree of statistical variance is expected in provided signature iterations. Therefore, if during a subsequent signature validation process a large degree of statistical variance is observed in the provided signature iteration, it is more likely that the provided signature is a fraudulent signature.

FIG. 3a illustrates an example of a provided signature 29. In the illustrated example the name "Yossi" has been provided. The stylistic script, which graphically characterises the signature, is clearly visible in the illustrated example. As mentioned previously, multiple signature entry enables the behaviometric signature system 1 to generate tolerance threshold values which account for disparities (i.e. statistical variances) between different provided iterations of a signature. As mentioned previously, generated threshold values may be user-specific, and will in part be dependent on how consistent a user is in reproducing substantially identical copies of their signature. A user that is able to consistently reproduce very similar copies of their signature will likely have small threshold values, compared to a user that is unable to reproduce similar copies of their signature. The present signature verification system is designed to cater for both extremes of user.

The larger the number of copies/iterations of the signature provided during enrolment the more accurate the empirically generated tolerance threshold values are likely to be. The term 'accurate' in the present context refers to statistical accuracy, and increases with the number of provided signature iterations during enrolment. The more accurately the generated thresholds quantify a user's ability to accurately and consistently reproduce their signature, the lower the likelihood of the verification system generating a false reject during a subsequent signature verification process. A false reject is generated when a genuine user fails the signature verification process, and for practical implementations of signature verification systems it is desirable to minimise the frequency with which false rejects are generated. Such a system and method may minimise the false reject rate and improve the usability of the signature verification system.

The quality and accuracy of generated behaviometric user information tends to increase with an increase in the number of signature iterations provided during enrolment.

In one aspect, five copies/iterations of the signature are provided during enrolment. The signatures provided during enrolment in the following discussion will be referred to as the reference signatures, to distinguish them from signatures provided for verification during a subsequent verification process. The remaining discussion of FIG. 4 will consider an embodiment wherein five reference signatures are provided during enrolment. However, this is not a hard requirement and that the described method may be carried out with any plurality of provided reference signatures (wherein by a plurality is intended two or more copies of a signature) such that a statistical correlation analysis may be carried out.

The enrolment process is initiated by user entry of a first reference signature on the appropriate signature entry device 3. The reference signature may be concurrently sampled by the signature entry device 3, at step 37, during entry, and normalised. After signature entry the enrolment system queries whether a sufficient number of copies of the reference signatures have been samples, at step 38. The number of required reference signatures may be prescribed by the enrolment entity. Steps 35, 37 and 38 are repeated until the prescribed number of reference signatures has been provided. In the presently described example five reference signatures are required, and thus steps 35, 37 and 38 are repeated for each one of the five provided reference signatures.

A signature may be represented as an ensemble of one or more geometric curves. These one or more geometric curves may be defined mathematically by one or more functions. Sampling may comprise recording a plurality of data points, each data point corresponding to a point located on the geometric curve. A sufficient number of data points on the curve must be sampled in order to mathematically define the geometric curve, which may interchangeably be referred to as a signature curve. In the following discussion the signature curve will be referred to in the singular. However, it is to be appreciated that the signature curve may be comprised of one or more different geometric curves each defined by a different mathematical function.

As mentioned previously in relation to FIG. 2, in order to mitigate for differences in scale (i.e. to compensate for differences in the relative sizes of the entered reference signatures) each one of the entered reference signatures may be normalised. This may be carried out during the sampling process, at step 37. Alternatively, it may be carried out following the sampling step 37. Normalisation mitigates the effects of scale on subsequent validation analyses, thus increasing the likelihood that the analysis results in an accurate result.

Once the system has determined that the prescribed number of reference signatures have been provided, at step 38, a first one of the provided reference signatures is selected and characterising nodes defined on the signature curve, at step 39. This may comprise selecting a subset of the sampled signature data points with a predetermined frequency and or at predefined intervals of separation. This selected subset of signature data points characterises the signature, and are referred to as characterising nodes in order to differentiate them from the remaining data points.

Selection of the characterising nodes may comprise, for example, selecting a subset of the sampled data points that are uniformly distributed along the signature curve. Similarly, data points in the vicinity and/or which bound characterising geometric features comprised in the signature may be selected.

One way of identifying characterising geometric features is to analyse the first and/or second order derivatives between adjacent sampled data points. Analysis of the derivatives may provide information regarding the geometry of the signature curve. In particular, analysis of the second order derivative may be used to determine local maxima, minima and/or points of inflection along the one or more geometric curves. This enables data points associated with significant geometrical variations on the signature curve to be readily identified and designated as characterising nodes.

Once the characterising nodes have been selected on the first selected reference signature, the corresponding data points present on the remaining reference signatures are identified, at step 41, using deterministic optimization methods discussed in further detail below. In the present example, this comprises identifying the corresponding data points on the four remaining reference signatures. This process is referred to as characterising node matching, since it comprises identifying the data points on the remaining reference signatures which correspond to the characterising nodes defined on the first reference signature.

A correlation analysis of the characterising nodes identified in the reference signatures is carried out, and associated statistical variances identified, at step 43. The object is to determine threshold and/or tolerance values that need to be incorporated within the user's behaviometric profile template 9, associated with each one of the characterising node values.

The correlation analysis effectively analyses the relative geometric and temporal relationships between corresponding characterising nodes defined on different reference signatures. This is enabled by sampling both positional and temporal data during the sampling process, at step 37, for each sampled data point. In this way, both the relative geometrical relationships between corresponding characterising nodes defined on different reference signatures, and the relative temporal relationships may be quantified. Further exemplary details of this sampling process are described in the following discussion.

The correlation analysis enables a mean coordinate value along with associated statistical variances to be defined for each characterising node by analysing the statistical variances associated with the coordinate values of each characterising node deployed on each reference signature. This may be determined by comparing relative coordinate values (both positional and temporal) associated with corresponding characterising nodes deployed on the different reference signatures. In other words, one may consider a single characterising node deployed on the five provided reference signatures. The coordinate value associated with the characterising node is likely to differ for each different reference signature on which it is deployed and defines a set of five different coordinate values (assuming that none of the reference signatures are identical). By analysing the set of different coordinate values it is possible to associate a mean coordinate value to the characterising node, in addition to an associated variance.

The present method may adopt relative coordinate values. Rather than defining the coordinates associated with a characterising node with respect to a fixed axis, the positions of the characterising nodes may be defined relative to neighbouring nodes. This may be achieved by associating a positional coordinate vector with each characterising node's position. The positional coordinate vector defines the characterising node's position with respect to a neighbouring node's position. In such embodiments, the relative coordinate values may relate to the scalar component of the positional coordinate vector. The relative mean scalar coordinate values, along with associated variance values are determined from the provided reference signatures. The statistical variance values define the one or more threshold values associated with each characterising node.

Positional coordinate vectors, including mean characterising node coordinate values and associated variances are stored in the user's behaviometric signature profile template 9, at step 45, for future reference during the signature validation process outlined in FIG. 2. The enrolment process is subsequently terminated at step 47, once the positional coordinate vectors have been populated in the user's behaviometric template 9.

In view of the foregoing summary of the registration and validation process, further specific details are set out below in relation to certain embodiments.

The entered signature may be sampled with a predetermined sampling rate, at step 15 of FIG. 2, during verification, and at step 37 of FIG. 4, during signature enrolment. The sampling rate may vary for different applications and will in part be dependent on the hardware capabilities of the signature entry device 3. For example, the signature may be sampled with a frequency in the range of 50 Hz to 200 Hz. Alternative sampling frequencies may equally be used. However, in general the greater the sampling rate the more accurate the derivable behaviometric information is likely to be. Similarly, a very low sampling rate may result in an insufficient number of sampled data points, which in turn may result in less accurate behaviometric information. Alternative sampling frequencies are also envisaged, which lie outside the provided sampling range, and fall within the scope of the present invention.

Each sampled data point may be associated with a four dimensional vector $A_v$, where v=x, y, t, c; the set {x,y} are spatial coordinates; t is a time coordinate, which may only take positive values; c is a cusp coordinate (equivalently referred to as a jumping or leaping coordinate, or a pen_up or pen_down coordinate), and is indicative of whether the corresponding spatial and temporal coordinates relate to a data point associated with a mathematical discontinuity. For example, a jump discontinuity and/or a removable discontinuity and/or a pen_up may be associated with a physical gap present in the signature curve. The gap present between the dot and the stems of the letters 'i' and 'j' are examples of a removable discontinuity. In this example the cusp coordinate indicates whether the subject spatial coordinate position is associated with a visible marking, or whether the spatial coordinate position relates to a gap in the signature curve.

The cusp coordinate is a binary value. For example, a cusp value of '0' may be allocated to a data point on the signature curve associated with a visible marking, whilst a cusp value of '1' may be allocated to a data point associated with a gap in the signature curve, or vice versa. The selected convention is irrelevant provided it is applied consistently.

Figure 5:
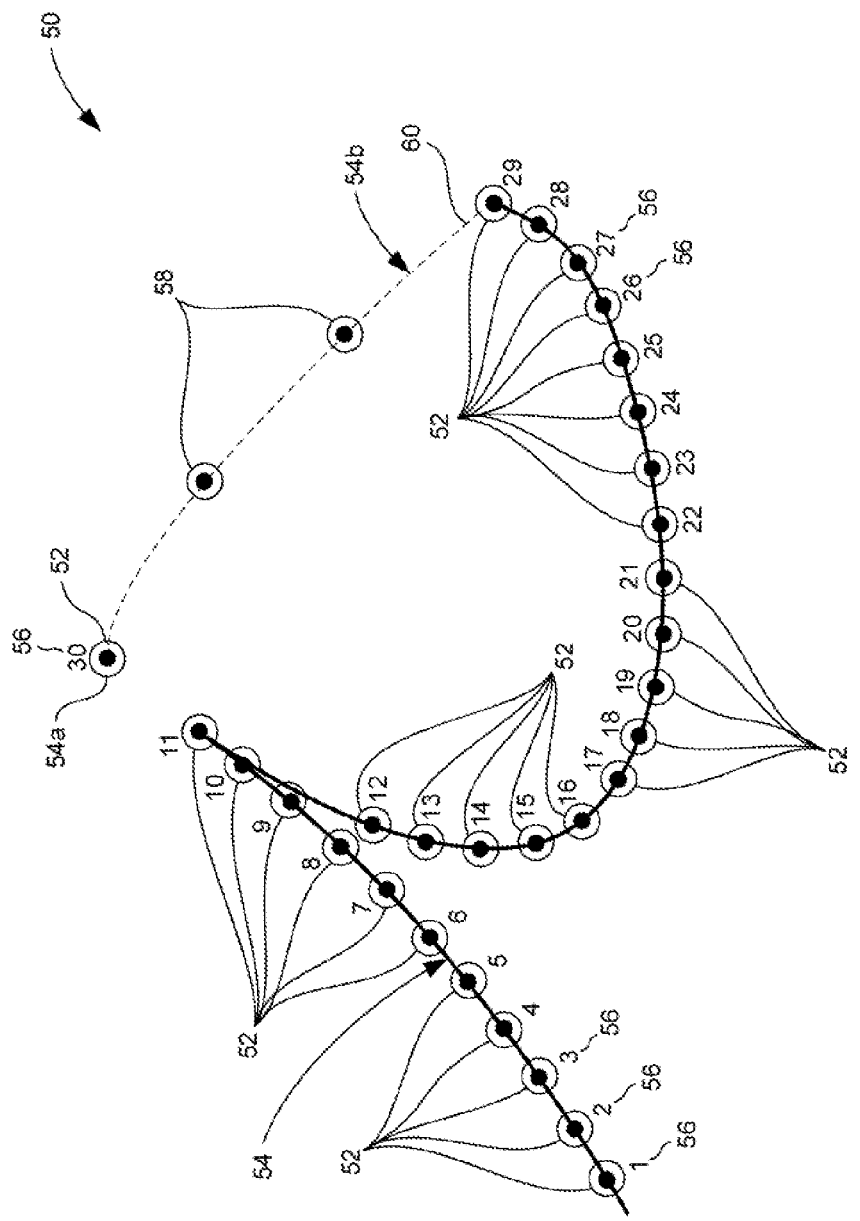
FIG. 5 illustrates a portion of a signature, showing how the signature portion is sampled in order to define a signature curve.

The cusp coordinate c may be considered in view of FIG. 5. In this example an analogy is made with the traditional method of using a pen to provide a signature on paper for illustrative purposes only, since the system illustrated in FIG. 1 does not require use of either pen or paper for signature entry. In accordance with this analogy, a '0' cusp value is associated with a 'pen down' position, and a '1' cusp value is associated with a 'pen_up' position. In the following description a cusp coordinate value associated with a 'pen_up' position may interchangeably be referred to as a 'pen_up event,' and a cusp coordinate value associated with a 'pen down' position may interchangeably be referred to as a 'pen_down event.' In other words, a '0' is associated with a data point associated with a visible marking, whilst a '1' is associated with a non-visible region. In FIG. 5 the letter 'i' 50 is illustrated, and comprises a plurality of sampled data points 52 defined along the visible portion of the signature curve 54 comprising the dot 54a.

Each one of the sampled data points 52 is associated with a time coordinate. For present purposes, a number 56 indicative of the chronological order in which the different data points on the signature curve have been entered is illustrated. It should be understood that the number 56 indicative of the chronological order in which the sampled data points have been entered is proportional and derivable from the associated time coordinate associated with the specific data point in question, obtained during sampling at step 15 of FIG. 2 or step 37 of FIG. 4. In this way, it is possible to discern the chronological order in which the stylised script of the signature was entered by the user. For example, the chronological order number 56 associated with the dot 54a indicates that this was the last part of the signature that was entered, because its chronological number value is '30'.

The term 'signature curve' may comprise the visible and non-visible line segments, which join all the sampled data points, including singularities such as the dot 54a. Defined in this way the signature curve may not necessarily be equivalent to the stylized script of the signature—it is not exclusively restricted to the visible signature markings 54, 54a. Whilst all the data points associated with visible signature markings are comprised in the signature curve, the signature curve may also comprise a non-visible portion 54b, comprised of data points associated with regions of the signature, which are not associated with visible markings, but that have nonetheless been sampled by the signature entry device 3. For example, interpolated data points 58 (discussed in further detail below) are examples of data points associated with the non-visible portion 54b of the signature curve, and are therefore associated with a '1' cusp coordinate value. In other words, the interpolated data points 58 are associated with a 'pen up' position in the present analogy.

Data points associated with a '1' cusp coordinate value (equivalently referred to as 'pen_up') arise when a data point is sampled on the non-visible portion of the signature curve. The positional coordinates of the sampled data point may then be defined using known interpolation techniques. These interpolated data points 58 lie in the region of the curve discontinuity between the visible sampled data point 60 and the singularity 54a, associated with the dot of the letter 'i'.

Alternatively, the data points associated with a '1' cusp coordinate value ('pen_up') may effectively be represented by a two-dimensional vector (2D), comprising a time coordinate value and a cusp coordinate value only. This avoids having to interpolate the positional coordinates of the data point. In such examples, the sampled data points comprised on the visible portion of the signature curve are 4D vectors, whilst the sampled data points comprised on the non-visible portion of the signature curve are 2D vectors.

Alternatively, sampled data points associated with a '1' cusp coordinate value may be ignored and discarded from the sampled data set. For example, all the sampled data points bounded by a data point associated with a pen_up coordinate and a data point associated with a pen_down coordinate may be discarded. This effectively excludes all but one data point located within the signature curve discontinuity (i.e. within the signature gap). This can reduce computational load, since interpolation of pen_up spatial coordinate values is omitted. In this example the signature curve substantially corresponds to the visible portion of the signature curve.

In certain embodiments, a provided signature may be sampled at a variable sampling rate. This may be achieved by sampling different data points at different frequencies. This reduces the statistical likelihood of any two different signature iterations being identically sampled, and ensures that different data points are sampled for each provided signature iteration. The result of this sampling process is that the set of sampled data points associated with each sampled signature iteration forms a unique data set, which data set may be used to improve the security of the present method. One way in which security may be improved is by executing a hashing function with the sampled data set. Since each sampled data set is unique, the resulting hash associated with each sampled signature iteration is also unique. The hash value associated with each sampled provided signature may be verified during the verification process of FIG. 2. For example, this may be carried out during step 15 once the provided signature has been sampled. Furthermore, the verification device 7 may be arranged to maintain a log of received hash values. In this way, if a signature is provided having a hash value, which corresponds to the hash value of a previously received signature, an error may be flagged, and a verification refusal result returned. The use of a hash function improves the security of the present method and specifically affords protection against relay-type attacks, where a previously sampled signature is recycled. For example, this might occur where a set of data points associated with a previously sampled signature is forwarded to the verification device 7 for verification.

One way in which a random sampling rate may be obtained is through use of multi-thread processing. The device for receiving a signature 3 may comprise a central processing unit (CPU), arranged to execute at least two parallel instruction threads sequentially in the order in which they are received. For example, a first thread may relate to a primary sampling thread instructing the CPU to sample the received signature with a specific frequency, whilst a secondary thread may relate to an alternative instruction set, which is processed in the event that there are insufficient system resources to handle the primary thread. Alternatively, different sampling instructions may be comprised in different instruction threads, which when executed by the CPU instruct the device for receiving a signature 3 to sample the received signature at different rates. For example, the device for receiving a signature 3 may be capable of sampling at a rate of 50 Hz to 100 Hz. A sequence of three different instruction threads may be used to provide the sampling instructions. The first instruction thread may instruct the device 3 to sample at a rate of 60 Hz, whilst the second and third threads may instruct the device to sample at rates of 80 Hz and 100 Hz respectively. This ensures that the provided signature is sampled at a variable sampling rate oscillating between 60 Hz and 100 Hz in this example.

Sampling

As mentioned previously in relation to FIGS. 2 and 4 during both the verification and enrolment processes at steps 15 and 37 respectively, the one or more provided reference signatures are sampled. This comprises sampling in both the spatial and time domains, in addition to associating a cusp coordinate value c to the sampled data point (e.g. a '1' for a pen_up event, and a '0' for a pen_down event). This results in a four-dimensional (4D) vector $A_{v_i}$, where i=1, 2, 3, 4 ... n; and i∈N being associated with every sampled data point. The variable n is indicative of the total number of vectors associated with the data points, and is therefore also indicative of the total number of sampled data points. The variable v has its usual meaning as defined previously. The signature curve may then be defined as a time-ordered series function $f_k(A_v) = \Sigma_i^{k \le n} A_{v_i}$ where $A_{v_i}$ is a vector delta. The variable may be any positive integer, and designates different vectors associated with the different data points, including data points associated with non-visible portions of the signature curve.

Since each sampled 4D data point comprises a time coordinate value, the elapsed time with respect to the preceding 4D data point may be determined, such that a velocity vector (V) and an optional acceleration vector ($\dot{V}$) may be associated with each sampled data point. The velocity and acceleration vectors capture a user's hand movement behaviometric information.

The normalisation process adopted in certain embodiments, at steps 15 and 37, comprises scaling the provided signature to fit into a predefined rectangle, having a predefined size. For example, the normalization rectangle may have a pixel size of 128,000×96,000. Alternative normalization methods may also be used in accordance with the present invention.

The sampling process (step 15 of FIG. 2; step 37 of FIG. 4) may also comprise a data point density analysis process to determine if a sufficient number of data points have been sampled along the signature curve. This may be carried out in both the spatial domain and in the time domain. The more well defined the signature curve is, the more accurate the derivable behaviometric information.

For the spatial domain, this is achieved by determining if the distance interval between two sampled data points $(x_{i+1}, y_{i+1}, t_{i+1}, c_{i+1})$ and $(x_i, y_i, t_i, c_i)$, i=1, 2, 3, ..., n lies within a predetermined threshold value, $$(x_{i+1}-x_i)^2 + (y_{i+1}-y_i)^2 \le \text{Maximum allowed distance interval}^2 \quad \text{eq. 1.0}$$

For the time domain, this is achieved by determining if the time interval between two sampled data points is larger than a predetermined threshold value, $$(t_{i+1}-t_i)^2 \le \text{Maximum allowed time interval}^2 \quad \text{eq. 1.1}$$

If either the distance interval threshold or time interval threshold condition of equation 1.0 and/or equation 1.1 is violated, then known linear interpolation techniques may be used to interpolate additional data points on the signature curve within the relevant interval.

The sampled data point density analysis, using equations 1.0 and 1.1 is carried out for all sampled data points along the signature curve. The cusp coordinate value of any interpolated data points will be consistent with the cusp coordinate values of the bounding sampled data points. For example, where the cusp coordinate value $c_{i+1}$ and $c_i$ of two sampled data points bounding an interpolated data point are '0', then the interpolated data point's cusp coordinate value is also '0'. In other words, if two bounding sampled data points relate to a pen_down event, then the interpolated data point located between both sampled data points will also be associated with a pen_down event. Likewise, where the cusp coordinate value of the two bounding data points is '1', then the interpolated data point's cusp coordinate value is also '1'—i.e. a pen_up event. Conventional numerical interpolation techniques may be used, e.g., the text book "A simple introduction to numerical analysis: Volume 2: Interpolation and Approximation" by R. D. Harding and D. A. Quinney, published 1 Jan. 1989, © IOP Publishing Ltd 1989 includes a detailed discussion regarding numerical interpolation.

An illustrative example of a maximum allowable distance interval threshold between two sampled data points, may be nine pixels. In this illustrative example, if the distance interval between any two adjacent sampled data points is greater than nine pixels, then interpolation is used to define one or more additional data points within the interval, until the distance interval threshold condition of equation 1.0 is satisfied.

An illustrative example of a maximum allowable time interval may be five milliseconds, which corresponds to a signature sampling frequency of 200 Hz. Therefore, in this illustrative example, if the sampling rate of the signature entry device 3 is lower than 200 Hz, then interpolation can be used to populate the time intervals between adjacent sampled data points with one or more interpolated data points, until the time interval threshold condition of equation 1.1 is satisfied. Similarly, in certain embodiments interpolation may be used to compensate for any irregularities and/or fluctuations in the sampling rate of the signature entry device 3 in order to maintain a uniform sampled data set.

Interpolation may be used in certain embodiments where the device 3 for receiving the signature also executes other instruction sets associated with different applications. For example, in smartphones arranged to provide a plurality of different functionality, several different applications may be run in parallel, each application being associated with a different instruction thread, and each thread competing for the processor's processing resources. In this example, the processor (e.g. the CPU) may be temporarily unavailable for executing a sampling instruction thread, whilst executing an unrelated instruction thread associated with an unrelated application. For example, this might occur where the smartphone's CPU is occupied determining the GPS position of the handset. The CPU may become temporarily unavailable for executing instruction threads associated with the signature sampling process, which may result in a larger time interval and/or distance interval gap between two adjacent sampled data points. Rather than reinitiating the sampling process, which can be inconvenient, numerical interpolation may be used to complete the sampled data point set.

Optionally, a smoothing function may be used to improve the accuracy of the interpolated data points. This may be achieved by minimising the following action integral, $$f(A_\theta, K) = \text{Min} \int_{t=0}^{t=T} \left( (\text{signature curve} - f)^2 + K\left(\frac{df}{dt}\right)^2 \right) dt \quad \text{eq. 1.2}$$

where the signature curve $A_\Theta$ is the set of all sampled data points $B_\nu$ and interpolated $C_\mu$ data points (i.e. $A_\Theta = B_\nu \cup C_\mu$), $f$ is the smoothing function, and K is a constant which may have a value of 0.5 or less. In this way $f(A_\Theta, K)$ is the smoothed function.

Use of a smoothing function may reduce the impact a sampled data point associated with a sharp variance compared to adjacent data points, such as a delta function, has on the verification results. As a result, verification results tend to be more stable. Furthermore, use of a smoothing function during the enrolment process may result in lower determined statistical variance values. This can improve the security of the system by making signatures harder to forge, reducing the false positive rate.

The action integral of equation 1.2 may be minimised by solving the well-known Euler-Lagrange equations of the calculus of variations as a discrete problem, which results in a set of linear equations solved using a three diagonal matrix.

Identification of Characterising Nodes

As discussed in relation to FIG. 4, during enrolment a first selected reference signature is analysed and characterising nodes identified, at step 39. Some of the ways that this step may be achieved are now discussed.

The characterising nodes may be defined by selecting a subset of the sampled vectors (recall that the sampled data points are vectors), disregarding any vectors associated with a cusp value of '1' (a pen_up event), such that the selected subset of vectors are substantially evenly distributed throughout the visible portion of the signature curve at uniform length intervals. The selected subset of vectors are referred to as characterising nodes in the following discussion.

Since vectors associated with a cusp value of '1' are disregarded, the nodes relate exclusively to 4D vectors. The density of the nodes is typically much lower than the density of all sampled vectors. Nodes are of the form $(x_{i_1}, y_{i_1}, t_{i_1}, \mathrm{pen\_down}_{i_1})$, $(x_{i_2}, y_{i_2}, t_{i_2}, \mathrm{pen\_down}_{i_2})$, ..., $(x_{i_m}, y_{i_m}, t_{i_m}, \mathrm{pen\_down}_{i_m})$. The characterising nodes are may be separated from each other with an approximately uniform interval of separation, given by the following inequality.

$$r_{j+1} = \sqrt{(x_{i_{j+1}} - x_{i_j})^2 + (y_{i_{j+1}} - y_{i_j})^2} \cong \mathrm{Constant} \qquad \text{eq. 1.3}$$

where j=1, 2, 3, ... m and j∈N. While the system and method may favour approximately separating the characterising nodes with uniform intervals of separation, the interval of separation between nodes may diverge from the uniform interval defined in equation 1.3. Equation 1.3 is the Pythagorean Theorem expressed in two dimensions. The distance interval of equation 1.3 only considers geometrical coordinate values, whilst the time and cusp coordinate values are ignored. The index j is used to represent a node, and is not to be confused with the index i, which is used to track the vectors associated with sampled data points, henceforth referred to simply as sampled vectors. The number of nodes m deployed along the visible portion of the signature curve is selected to be less than or equal to half the number of sampled vectors, such that the following condition is satisfied $$m \leq \frac{1}{2}n \qquad \text{eq. 1.4}$$

where n is the number of sampled vectors. This may result in significantly reduced processing requirements.

The m nodes are subsequently deployed on the remaining four signatures provided during enrolment in step 35, at step 41. The term 'deployed' as used in the present context is used to refer to the process whereby the sampled vectors comprised on the remaining four signatures are analysed to identify those vectors which substantially correspond to the characterising nodes defined on the first selected signature.

The intervals of the newly deployed nodes, as given by equation 1.3, may be expressed as $$r_{j+1} = \sqrt{(x_{l_{j+1}} - x_{l_j})^2 + (y_{l_{j+1}} - y_{l_j})^2} \cong \mathrm{Constant} \qquad \text{eq. 1.5}$$

where l=1, 2, 3, ..., L, l∈N represents the number of vectors sampled on the new signature curve, and is unlikely to be equivalent to the number of vectors sampled on the previous signature curve, L≠n. Furthermore the number of vectors L sampled on each new signature curve may be unique, especially where a variable sampling rate is used, and therefore each signature curve may be associated with a different number of sampled vectors L. The constant interval of separation condition set out in equation 1.5 is an approximate relationship, and intervals of separation may diverge from the uniform interval defined in equation 1.5.

The number of nodes m deployed on the visible portions of each remaining signature remains constant $$(\hat{x}_1, \hat{y}_1, \hat{t}_1, \hat{\mathrm{pen\_down}}_1), (\hat{x}_2, \hat{y}_2, \hat{t}_2, \hat{\mathrm{pen\_down}}_2), \ldots, (\hat{x}_m, \hat{y}_m, \hat{t}_m, \hat{\mathrm{pen\_down}}_m) \qquad \text{eq. 1.6}$$

where the '^' symbol is used to differentiate the nodes deployed on the remaining four signatures from those deployed on the first provided signature.

The condition of equation 1.4 is maintained for the remaining four provided signatures—the number of nodes m' is less than or equal to half the number of sampled vectors L—which may be expressed as $$m \leq \frac{1}{2}L \qquad \text{eq. 1.7}$$

If this condition is not satisfied for any one of the remaining signatures then a sampling error result may be returned by the signature entry device 3 and displayed on the display device 5. Such an error may be associated with an inadequately sampled signature, for example.

This analysis may be carried out at step 41 by either the signature entry device 3, or by the verification device 7. In the event that a sampling error result is returned, the user may be requested to re-enter their signature, or if a sufficient number of signatures have already been provided, then the signature resulting in the returned error result may be discarded. The latter option may occur where a sufficient amount of behaviometric information has been derived from the preceding signatures. Discarding of one provided signature copy under such circumstances is not expected to unduly compromise the quality of the derived behaviometric information.

The node deployment process is completed by ensuring that the nodes have been deployed on the remaining signatures at substantially equivalent feature positions along the visible portions of the different signature curves. This process is complicated by each different signature curve representing a different signature iteration. Therefore, each signature curve will comprise features which differ slightly from each other signature curve. For this reason a method relying on graphical comparison of the signatures, in order to identify correlated points, may be unsuitable in various circumstances since it will be inaccurate because two non-identical objects are compared. Similarly, a method which matches equivalent coordinates position may also be unsuitable in various circumstances because such a method does not ensure that equivalent features are matched. In view of the foregoing, deterministic matching process may be used as mentioned previously and described in further detail below.

Deterministic Matching

The object of the deterministic matching process employed in certain embodiments is to identify the vectors comprised in the remaining four signatures which are most correlated with the nodes deployed on the first provided signature. In the present context the term 'correlated' when associated to vectors is used to mean substantially parallel in orientation. The scalar product of two vectors (also commonly referred to as the 'vector dot product') may be used for this purpose.

The scalar product of two vectors is proportional to the cosine of the angle of separation between the vectors. If the orientation of the two vectors is the same, the angle of separation is zero, and the scalar product is maximised. If the orientation of the two vectors deviates by $\pi/2$ then the scalar product is zero. The scalar product is minimised when the two vectors are separated by $\pi$—e.g. when the two vectors are oriented in opposite directions. Two vectors which are associated with the same node should be substantially parallel in orientation and accordingly the dot product of such vectors is maximised.

Further details of the optimization process will now be described with reference to a first sampled signature curve on which nodes have been defined, and a second sampled signature curve on which the nodes are to be deployed.

The object of the optimization process is to identify a counterpart vector present on the second signature curve for each characterising node defined on the first provided signature. The counterpart is selected as the vector, which is most correlated with the node defined on the first signature. The correlation may be determined from the vector dot product. This process is repeated for every defined node, in order to identify the counterpart vectors present on the second signature curve.

An optimization function M may be defined which is proportional to the scalar product of two vectors, and which is algebraically defined as $$M = \Sigma_{j=1}^{n} f(r_{j+1} * \hat{r}_{j+1}) * g_{j+1} \qquad \text{eq. 1.8}$$

where, $$r_{j+1} = \sqrt{(x_{i_{j+1}} - x_{i_j})^2 + (y_{i_{j+1}} - y_{i_j})^2} \qquad \text{eq. 1.9}$$

$$\hat{r}_{j+1} = \sqrt{(\hat{x}_{i_{j+1}} - \hat{x}_{i_j})^2 + (\hat{y}_{i_{j+1}} - \hat{y}_{i_j})^2} \qquad \text{eq 1.10}$$

define the line segment lengths, or intervals between adjacent nodes, on respectively the first signature (equation 1.9) and on the second signature (equation 1.10) curves. The '^' symbol is used to denote sampled data points, and/or characterising nodes defined on the second signature. The line segment lengths are the scalar components of their associated vector quantities. The function $g_{j+1}$ is proportional to the cosine of the angle of separation between the two vectors $(x_{i_{j+1}} - x_{i_j}, y_{i_{j+1}} - y_{i_j})$ defined on the first signature curve and $(\hat{x}_{i_{j+1}} - \hat{x}_{i_j}, \hat{y}_{i_{j+1}} - \hat{y}_{i_j})$ defined on the second signature curve. The product of the scalar components of the aforementioned two vectors $f(r_{j+1} * \hat{r}_{j+1})$ is a convex function.

The vector counterparts of characterising nodes defined on the first signature are identified by maximising the matching function M and solving for each $j^{th}$ index $$\text{maximise } M = \max \Sigma_{j=1}^{n} f(r_{j+1} * \hat{r}_{j+1}) * g_{j+1} \qquad \text{eq. 1.11}$$

Solving the above equation identifies the indices of the counterpart vectors located on the second provided signature, which are most correlated with the nodes deployed on the first signature. In other words, for each node j, maximising the matching function M identifies the associated $l_j^{th}$ vector comprised on the second signature curve, which is most correlated with the $j^{th}$ node. Accordingly, the present optimization process may also be referred to as indices matching, the object being to identify the indices $l_j$ such that $j=1, 2, 3, \ldots, m$ and $l_{j+1} > l_j$.

The matching function $M_j$ for matching the $j^{th}$ characterising node, in accordance with equation 1.11, may be of the form $$M_j = F(\theta_j) * G(d_j, d_{j+1}) * Q(r_j * d_j) \qquad \text{eq. 1.12a}$$

such that the total matching is given by $$\text{Total Matching} = M = \Sigma_{j=0}^{m-1} M_j \qquad \text{eq. 1.12b}$$

where $F(\theta_j)$, $G(d_j, d_{j+1})$, and $Q(r_j * d_j)$ are differentiable functions.

The matching function M may be expressed as a series over all nodes $$\Sigma_{j=0}^{m-1} F(\theta_j) * G(d_j, d_{j+1}) * Q(r_j, d_j) \qquad \text{eq. 1.13}$$

Using the following definitions:

$$dX_{node\,j+1} = X_{node\,j+1} - X_{node\,j}$$

$$dY_{node\,j+1} = Y_{node\,j+1} - Y_{node\,j}$$

$$dX_{curve\,i_{j+1}} = X_{curve\,i_{j+1}} - X_{curve\,i_j}$$

$$dY_{curve\,i_{j+1}} = Y_{curve\,i_{j+1}} - Y_{curve\,i_j}$$

$$r_j = \sqrt{dX_{node j+1}^3 + dY_{node j+1}^3}$$

$$d_j = \sqrt{dX_{curve i_{j+1}}^2 + dY_{curve i_{j+1}}^2} \qquad \text{eq. 1.14}$$

$\theta$ may be defined as the angle formed between the vectors $dX_{node\,j+1}$, $dY_{node\,j+1}$ and $dX_{curve\,i_{j+1}}$, $dY_{curve\,i_{j+1}}$.

$F(\theta_j)$, $G(d_j, d_{j+1})$, and $Q(r_j * d_j)$ have 0 as their minimum value. $F(\theta_j)$, and $G(d_j, d_{j+1})$ are positive and have an upper positive value, and $Q(r_j * d_j)$ is a convex function, such that $Q(ax_1 + (1-a)x_2, ay_1 + (1-a)y_2) \geq aQ(x_1, y_1)$, where $0 \leq a \leq 1$. Whilst Q is a monotonically increasing function, Q', its derivative, monotonically decreases to zero. For example, one may consider a convex function $Z(x) = \ln(1+x)$, its derivative $Z'(x) = 1/(1+x)$, which tends to zero for increasing x. Thus, whilst $Z(x)$ is a monotonically increasing function, its derivative is monotonically decreasing. Similarly, the convex function $Y(x) = x^k$ for $0 < k < 1$ is another example of a monotonically increasing functions, whose derivative is monotonically decreasing—e.g. $Y'(x) = kx^{(k-1)} = k/(x^{(1-k)})$.

The object of the convex function $Q(r_j * d_j)$ in equations 1.12a, 1.12b and 1.13 is to reduce or dampen the effects of edge to edge matching. If the value of the function Q is large when the product $r_j * d_j$ is large then the matching function may inadvertently match vectors associated with similarly long scalar components (e.g. associated with similarly long line segments) in order to increase the value of the matching function $M_j$ even where the matched vectors are associated with different geometric features of the signature curve—e.g. different letters in a signature. Function Q may thus be convex. A convex function is associated with a smaller gradient than for example a linear function, and therefore the rate at which the value of a convex function changes is lower. Use of a convex function in the matching process may result in more stable matching results, which are not as affected by the product of scalar vector lengths, compared to other forms of function. This reduces the likelihood that a characterising node will be matched to a sampled data point associated with a disparate part of the received signature.

$G(d_j,d_{j+1})$ provides a measure of how well distributed the characterising nodes are, and is a maximum when $d_j=d_{j+1}$. In addition, the function $G(d_j,d_{j+1})$ fine-tunes the matching function value when matching between a characterising node and a sampled vector associated both associated with pen_down events. $F(\theta_j)$ is dependent on the angle $\theta_j$ formed between $dX_{node\ j+1}$, $dY_{node\ j+1}$, $dX_{curve\ i_{j+1}}$, $dY_{curve\ i_{j+1}}$, and $dX_{node\ j+1}$, $dY_{node\ j+1}$. In other words, $\theta_j$ is the angle formed between the vector located on the provided signature, $X_{curve\ i_{j+1}} - X_{curve\ i_j}$, $Y_{curve\ i_{j+1}} - Y_{curve\ i_j}$, and the characterising node comprised in the user's behaviometric signature profile template 9, $X_{node\ j+1} - X_{node\ j}$, $Y_{node\ j+1} - Y_{node\ j}$. A characterising node, $node_j$, provided in the behaviometric signature template 9 is matched to sampled data point, $curve_{i_j}$, comprised in the provided signature.

$F(\theta_j)$ may be selected to be positive and have a lower bound of 0.

The angle $\theta_j$ may be defined with respect to a reference line, defined on the new signature curve, which serves to maintain rotational invariance.

The precise form of the matching function may be selected dependent on certain conditions present on the signature curve. For example, the form of the matching function selected for matching a characterising node associated with a pen_down event, to a vector on the signature curve also associated with a pen_down event may be different to the form of matching function used to match a characterising node associated with a pen_up event to a vector associated with a pen_up event. The selected matching function value may be selected so as to not should not vary excessively as a result of legitimate variances between different provided signature iterations provided by an authentic user, in order to guarantee consistent matching results. Certain such forms of matching function which meet this requirement are discussed below.

The matching function $F(\theta_j)*G(d_j,d_{j+1})*Q(r_j*d_j)$ of equation 1.12a may be amended in accordance with the following different cases:

Where the node j+1 is associated with a pen_up event and the vector on the curve sample curve $i_{j+1}=(x_{i_{j+1}}, y_{i_{j+1}}, t_{i_{j+1}}, pen\ up_{i_{j+1}})$ is also associated with a pen_up event, then the matching function $M_j$ of equation 1.12a may be selected to have the form)

$$M_j = F_2(\theta_j)*Q(r_j,d_j) \quad \text{eq. 1.15}$$

Since in the present scenario both the characterising node and the sampled vector being matched are associated with a pen_up event, the $G(d_j,d_{j+1})$ component may be omitted from the matching function. In other words, because both the characterising node and the sampled vector present on the subsequently provided signature are associated with a gap in the visible portion of the signature curve.

Where the node j+1 is associated with a pen_up event, and the vector on the curve sample curve $i_{j+1}=(x_{i_{j+1}}, y_{i_{j+1}}, t_{i_{j+1}}, pen\_down_{i_{j+1}})$ is associated with a pen_down event, then the matching function $M_j$ may be selected to have the form $$M_j F_3(\theta_j)*Q(r_j,d_j) \quad \text{eq. 1.16}$$

where $F_3 \neq F_2$, and the difference between the two functions is related to the derivative of the logarithm of the function, $$\frac{\frac{dF(\theta_j)}{d\theta_j}}{F(\theta_j)}$$

which is $$\frac{d\log(F(\theta_j))}{d\theta_j}$$

This value is smaller for $F_3$ than for $F_2$.

In this scenario, the characterising node is associated with a gap in the visible portion of the signature curve, whereas the vector present on the subsequently provided signature is associated with a visible portion of the signature. The function $G(d_j,d_{j+1})$ has been omitted from equation 1.16 because the characterising node is associated with a gap (i.e. a pen_up event).

Where the node j+1 is associated with a pen_down event, and the vector on the curve sample curve $i_{j+1}=(x_{i_{j+1}}, y_{i_{j+1}}, t_{i_{j+1}}, pen\_up_{i_{j+1}})$ is associated with a pen_up event, then the matching function $M_j$ may be selected to have the form, $$M_j = \frac{F(\theta_j)*G(d_jd_{j+1})*Q(r_j,d_j)}{10} \quad \text{eq. 1.17}$$

In this scenario, the characterising node is associated with a visible portion of the signature curve, whereas the vector present on the subsequently provided signature is associated with a gap in the visible portion of the subsequently provided signature.

Where the node j+11 is associated with a pen_down event, and the vector on the curve sample curve $i_{j+1}=(x_{i_{j+1}}, y_{i_{j+1}}, t_{i_{j+1}}, pen\_down_{i_{j+1}})$ is also associated with a pen_down event, then a matching function having the form of equation 1.12a may be used. In this scenario, both the characterising nodes and the vector present on the subsequently provided signature are associated with visible portions of their respective signature curves.

The form of matching function selected for use in the optimization process is dependent on the characteristics of the node and on the characteristics of the vector comprised on the signature curve. A different matching function is used depending on the characteristics of the node-vector pair being matched, in particular on whether the node-vector pair is associated with a pen_up event. Preferably, the device 3 for receiving a signature may be configured to select the most appropriate form of matching function, on the basis of the node-vector characteristics. Alternatively, the verification device 7 may be configured to select the most appropriate form of matching function.

Equation 1.9 defines the scalar component of the vector associated to a node j as the line segment $r_{j+1}$ between two adjacent nodes j+1 and j, and is therefore dependent on the relative geometrical relationship between the two adjacent nodes. The geometrical orientation of the vector will be determined by the relative orientation of this line segment. The matching process of equation 1.11 effectively identifies the corresponding sampled vector located on the second signature curve, whose associated line segment has a geometrical orientation with respect to an adjacent sampled vector, which most resembles the geometrical orientation of the characterising node's associated line segment defined on the first signature. Since the orientation of the characterising node as defined on the first signature (and therefore the associated line segment) is also dependent on the relative geometrical relationship between two adjacent characterising nodes, the matching process of equation 1.11 effectively analyses and seeks to preserve relative local geometrical relationships.

To improve accuracy and preserve global geometrical relationships between signature iterations, the optimization process may be repeated using an alternative node deployment density. In other words, the characterising nodes are deployed on the first signature with a different density. In order to distinguish this optimization iteration from the previously described iteration, it will be referred to as global optimization, whereas the previous iteration will be referred to as local optimization.

During global optimization, for example, half as many nodes with respect to the number of nodes deployed during local optimization, are deployed on the first signature. The number of deployed nodes m' may be:

$$m'=m/2 \qquad \text{eq. 1.18}$$

where m is the number of nodes deployed during local optimization. The number of deployed nodes m' is less than or equal to a quarter the number of sampled vectors L—e.g. m'≤L/4. As a result of this deployment, the line segments (recall equations 1.9 and 1.10) between adjacent nodes will be larger than the line segments between adjacent nodes found during local optimization. Node matching (the optimization process) is carried out in a similar manner as described previously.

An alternative to re-deployment of the nodes to obtain the required node density, as set out in equation 1.18, is to select alternating nodes previously deployed on the first signature, and to repeat the optimization process as previously described, using these nodes. It may be noted that the line segments in this example will be longer than their local optimization counterparts.

This lower resolution global optimization process establishes whether global geometrical relationships are maintained in the different signature iterations. It may be beneficial to analyse global geometrical relationships between sampled vectors, because global relationships tend to display a larger degree of invariance between different iterations of the same signature, whereas local geometrical relationships are more prone to variation. For this reason, analyses of global geometrical relationships can often provide a good indication of whether a provided signature is a forgery.

Both the local and global optimizations may be carried out by the signature entry device 3, or by the verification device 7 during enrolment, at step 41 of FIG. 4. During a subsequent validation process, local and global geometrical analysis may be carried out during correlation analysis, at step 21 of FIG. 2.

The local and global optimization processes are carried out on all the signature copies provided during enrolment. Where four different copies of the same signature have been provided, the local and global optimization matching processes are carried out three times each. Following the optimization matching process, each node may be associated with a set of coordinate values defining the position of the node on each different signature curve. In this way, a statistical variance may be determined for the position of each node at step 43 of FIG. 4, and this statistical variance along with the nodes may be stored in the user's biometric signature template 9, at step 45. Similarly, the local and global geometric relationships associated with each characterising node may also be stored, along with associated statistical variances. Optionally, the speed and acceleration associated with each node may also be stored. These behaviometrics are all stored in the user's behaviometric signature template 9, for use during a subsequent validation process. The enrolment process is then substantially complete.

During a subsequent validation process (see FIG. 2), at step 19 the nodes pre-stored in the user's behaviometric signature template 9 are deployed on the provided signature. The corresponding positions of the nodes on the newly provided signature are determined using both local and global optimization node densities. The statistical variance with respect to the pre-stored nodes is determined at step 21, and when the corresponding node positions fall outside the acceptable statistical variance associated with each node predefined in the user's biometric signature template 9, at step 23, then a validation fail result is returned at step 27. Similarly, if instead the determined statistical variance with respect to the pre-stored nodes is determined to fall within the allowable variance threshold defined in the user's behaviometric signature profile, at step 23, then a successful validation results is returned, at step 25.

Temporal Analysis

To improve the accuracy during validation, in certain embodiments, a temporal analysis of the sampled signature curve is carried out. This comprises analysing the time intervals between the deployed nodes to determine if the observed intervals are consistent with a user's behaviometric signature template 9. Since a genuine user will execute thousands of iterations of their signature during their life, the muscle movements required to execute the signature become automatic. Accordingly, it is expected that the temporal intervals will be substantially constant between different signature iterations. This analysis may also be performed by analysing the speed and acceleration vectors associated with each characterising node. Accordingly, in the below discussion the skilled reference to temporal analysis also comprises analysis of speed and acceleration.

During signature validation the temporal analysis may be carried out during correlation analysis, at step 21. This may comprise calculating the time intervals and/or the speed and/or acceleration vectors between matched nodes deployed on the received signature, and comparing the time intervals with the time intervals and/or the speed and/or acceleration vectors present between the characterising nodes comprised in the user's behaviometric signature profile template 9. If the calculated time intervals lie outside a permitted threshold, then a validation failed result may be returned at step 27, as indicative of a fraudulent user. Similarly, where the calculated velocity and/or acceleration values lie outside permitted thresholds, a validation failed result may be returned, terminating the validation process.

The above discussed temporal data may be derived during the enrolment process, because each sampled data point may be associated with a vector comprising a temporal coordinate value.

Temporal analysis can be useful for identifying attempted signature forgeries, because it relates to a class of behaviometrics which are dependent on a user's movements, namely, the muscle movements carried out in executing the user's signature.

Whilst an expert forger may be able to graphically reproduce a sufficiently identical copy of an authorised user's signature, it is harder for the expert forger to sufficiently reproduce the authorised user's muscle movements in creating the forged signature. In this way, temporal analysis of a received signature can help identify forgeries.

Geometric Analysis

Geometric analysis may be carried out during both the enrolment process and the validation process, and may comprise several different analyses. Such analyses may further improve the robustness of the signature verification method and system.

In certain embodiments a geometrical complexity analysis may be carried out, the object being to determine if the provided signature is geometrically sufficiently complex to enable sufficient behaviometric information to be derived therefrom, for subsequent use in a reliable verification process. Typically, the more behaviometric information that is derivable from a provided signature the more secure the system will be. For example, relatively little behaviometric information may be derived from a substantially straight line. In general, the more geometrically complex a provided signature the more behaviometric information can be derived therefrom. Furthermore, the likelihood of a forged signature resulting in a false positive verification result decreases with increased behaviometric information, since there are more variables which can be used to determine the authenticity of the provided signature.

To safeguard the accuracy of the present system 1, and dependent on the specific applications, a minimum geometric complexity rating may be required of a provided signature during enrolment. For example, if the present verification system is used to control access to a safe containing high value documents, a high geometric complexity rating may be required. In such cases, the user may be required to provide their entire signature, comprising first, middle and surnames. In general, a complete signature is likely to be associated with a more complex signature curve, wherefrom more complex behaviometrics may be derived, than for example, a signature comprising only the initials of the user.

For lower-value applications, the geometrical complexity requirements may be reduced, and it may be sufficient to simply provide user initials during enrolment and subsequent validation.

The geometrical complexity analysis may be carried out by analysing first and/or second order derivatives associated with the sampled vectors and/or characterising nodes, thus effectively analysing the curvature changes along the signature curve. A geometrically simple curve will exhibit little curvature change, whilst a complex signature curve will exhibit substantial curvature change.

The geometrical complexity analysis may be carried out both during validation and enrolment. During enrolment, the complexity analysis may be carried out during the sampling stage, at step 37 of FIG. 4, or during the correlation analysis stage, at step 43 of FIG. 4. During validation, the geometrical complexity analysis may be carried out during the sampling stage, at step 15 of FIG. 2, or during the correlation analysis stage, at step 21 of FIG. 2. Conducting the geometrical complexity analysis during sampling has the advantage that the enrolment and or validation process, as the case may be, is immediately terminated in the event that the provided signature is not sufficiently complex, and a new signature entry cycle may be initiated. In this event the user will be instructed via the display device 5 to re-enter a more complex signature iteration. For example, the user may be instructed to enter their complete signature comprising first name and surname, and optionally middle name and/or initial.

Statistical and deterministic deviations may also be analysed. This may comprise analysing the geometrical relationship between a deployed node and a plurality of sequentially located neighbouring nodes deployed along the signature curve. For example, for each deployed node it may comprise analysing the geometrical relationship relative to the succeeding five nodes deployed sequentially along the signature curve. The number of sequential neighbouring nodes the geometrical relationship is analysed with respect is not necessarily required. Rather, the level of security may be increased by increasing the number of sequentially located neighbouring nodes included in the analysis for each node. In certain embodiments six consecutive nodes are used for short signature analysis and eight consecutive sequential nodes are used for long signature analysis. In this context, a short signature may be defined as a signature comprising at most four letters having a geometrical complexity, wherein the direction of the signature curve changes by $\pi$ (e.g. 180°) or more. For example, the letter 'C' is an example of a letter wherein the signature curve changes by $\pi$. In contrast a long signature may be defined as a signature comprising more than four letters comprising a signature curve which changes by $\pi$ or more. Accordingly, signature length may not be associated with the number of different letters comprised in the signature, but instead associated with the number of geometrically complex letters comprised in the signature.

During enrolment, the geometrical relationships may be calculated during correlation analysis, at step 43 of FIG. 4, and are stored in the user's behaviometric template 9, at step 45.

Figure 6:
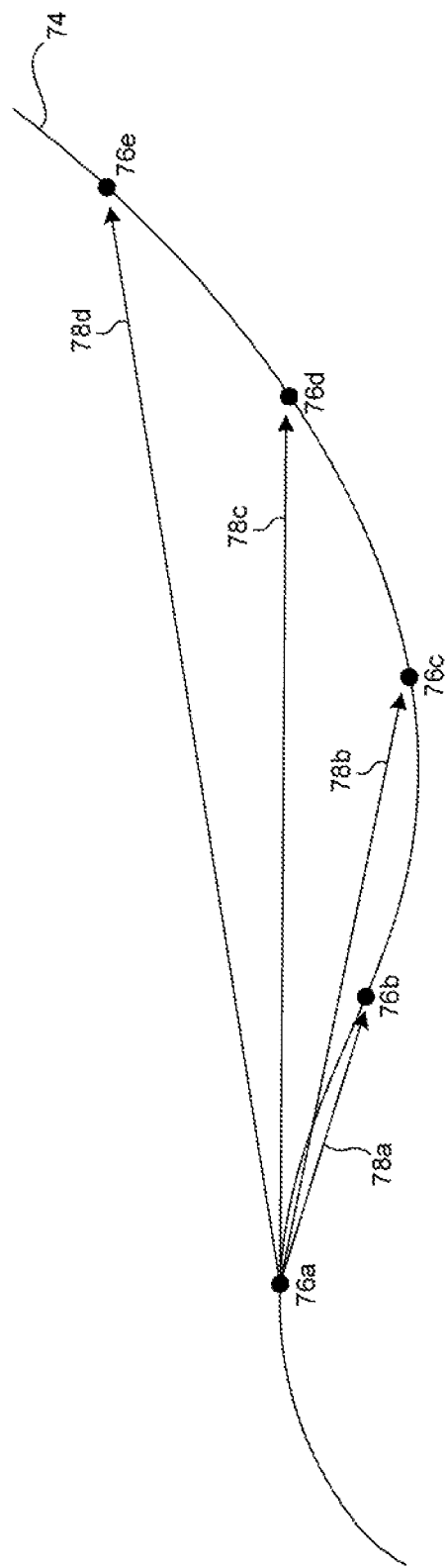
FIG. 6 is a visible portion of a signature curve comprising a plurality of characterising nodes, and shows how geometric relationship information may be calculated during the signature enrolment process of FIG. 4, or during the verification process of FIG. 2.

FIG. 6 provides an illustrative example of how geometrical relationship information may be calculated during enrolment. A portion of a signature curve 74 is illustrated comprising five consecutive nodes 76a, 76b, 76c, 76d, 76e located sequentially along it. Starting with the first node 76a, the geometric relationship with respect to each one of the neighbouring nodes 76b, 76c, 76d, and 76e is determined. The geometric relationship may be defined by a vector joining the two relevant nodes. For example, the geometric relationship between nodes 76a and 76b is defined by the vector 78a. Similarly, the geometric relationship between nodes 76a and 76c is defined by the vector 78b; the geometric relationship between nodes 76a and 76d is defined by the vector 78c; and the geometric relationship between nodes 76a and 76e is defined by the vector 78d. In the illustrated example, whilst only four geometric relationships are defined between the five illustrated nodes 76a, 76b, 76c, 76d, 76e, the five geometric relationships may be defined between six sequentially deployed nodes.

This process is repeated for each one of the signature iterations provided during enrolment. For example, if five iterations of a signature are provided during enrolment, the above described process is repeated for each signature iteration. In this way, an average and statistical variance value may be determined for each geometric relationship and used to define a threshold tolerance level, which is stored in the user's behaviometric template 9.

This geometrical analysis may be repeated for both the local and global optimization node densities. When the geometrical analysis is carried out for nodes deployed with a density provided by equation 1.7 (local optimization), the geometrical analysis effectively analyses local geometrical relationships. When the geometrical analysis is carried out for nodes deployed with a density provided by equation 1.18 (global optimization), the geometrical analysis effectively analyses global geometrical relationships.

During a subsequent validation process, the above described geometric analysis is repeated to identify the corresponding geometric relationships. Henceforth, any reference to geometric analysis comprises analysis of both local and global geometrical relationships, using the node densities associated with respectively local optimisation and global optimisation.

Geometrical relationships identified during validation are subsequently compared with the predefined threshold tolerance levels stored in the user's behaviometric template 9. If the calculated geometric relationships lie outside the threshold tolerance levels, then a consistency error may be raised and a validation failed result is returned, at step 27 of FIG. 2.

During enrolment the above described process may be carried out for each characterising node, such that the relative geometric relationships between each characterising node and its neighbouring nodes are defined. In this way, during a subsequent validation process, any one or more randomly selected deployed characterising nodes may be used for the purposes of carrying out the geometric analysis. This tends to reduce the required computing complexity and/or power since only the relative geometric relationships of a randomly selected subset of deployed characterising nodes is analysed. The geometric analysis may also be carried out on each deployed characterising node, processing power permitting.

Similarly, during validation the geometric analysis of one or more randomly selected deployed characterising nodes and the three adjacent sequentially located nodes may be analysed. Any number of sequentially located nodes may be used for geometric analysis.

For example, a sequence of eight deployed nodes of the form $Curve_{i_j}$ may be selected, as illustrated below:

e.g.
$Curve_{i_j}$, $Curve_{i_{j+1}}$, $Curve_{i_{j+2}}$, $Curve_{i_{j+3}}$, $Curve_{i_{j+4}}$, $Curve_{i_{j+5}}$, $Curve_{i_{j+6}}$, $Curve_{i_{j+7}}$ It is to be noted that the term deployed nodes in this example refers to the sampled vectors comprised on the subsequently provided signature, which have been matched to the characterising nodes comprised in the user's behaviometric signature template 9.

Alternatively, the geometrical relationships associated with six to eight sequentially located nodes may be analysed. In certain embodiments, geometrical analysis might comprise calculating a moving average of the geometrical relationships and monitoring how this average changes for each successive group of sequentially located nodes. For example, where six sequentially located nodes are selected, a length vector may be defined between the first selected node and each one of the five subsequently located nodes, as illustrated in FIG. 6. The statistical average of this length vector may be determined, and compared to the statistical average length vector calculated for a subsequently located group of six sequentially located nodes. This process may be repeated for each node comprised on the signature curve, such that a statistical average length vector value may be associated with each node. The moving average of the determined length vector may be stored for use during validation in the user's behaviometric signature template 9.

During a subsequent validation process a similar analysis is carried out in respect of the signature provided for validation. The moving average of the determined length vector may then be compared with the moving average data stored in the user's behaviometric signature template 9 for consistency. If significant variances in moving average are observed, which are larger than a predetermined threshold value, then a validation failed result may be returned, at step 27 of FIG. 2. This statistical average length vector is proportional to the geometrical relationships between adjacent vectors, and therefore if a large discrepancy is observed during validation, between the moving average values comprised in the user's behaviometric signature template 9 and a signature provided for verification, this is likely indicative of the provided signature being fraudulent.

In different embodiments, a different number of sequentially located nodes may be used to analyse a moving average of geometrical relationships. However, the information content of the moving average will be proportional to the number of different sequentially located nodes comprised in the moving average. In general, less geometrical information may be derived from a smaller number of sequentially located nodes. For example, if only two sequentially located nodes are used, then only one geometrical relationship datum may be derived—the length interval between the two adjacently located nodes. Such a selection provides a limited overview of any present geometrical relationships. For this reason, six to eight sequentially located nodes may be used for geometric analysis purposes. This choice of number of nodes may be based on consideration of local and/or global geometric relationships and processing restrictions.

The method may be tailored to the processing resources of the system. For example, method may be executed on hardware having relatively limited processing power, such as a smartphone.

Where processing power is available in abundance, the moving average may be calculated for more nodes, e.g. for more than eight sequentially located nodes.

The geometric analysis may also be combined with the previously described temporal analysis, in which case the time intervals between the selected nodes are analysed and compared with data comprised in the user's behaviometric template 9. As mentioned previously, this may comprise analysis of time and associated acceleration vectors.

Uncovered Curve Error

In certain embodiments an uncovered curve error analysis is also performed during validation. This comprises determining the amount of geometric information present between two adjacently deployed nodes, deployed on a signature provided for verification. If the determined geometric information is greater than a threshold value, an error is flagged. This means that the provided signature comprises a curve portion absent from the user's behaviometric signature template 9, and may be indicative of a forged signature, in which case a validation failed result is returned at step 27 of FIG. 2.

The geometric information may be determined from an analysis of first and/or second order derivatives associated with sampled vectors present between deployed nodes. For example, consider the adjacently deployed nodes ($\hat{x}_{k_{j+1}} - \hat{x}_{k_j}$, $\hat{y}_{k_{j+1}} - \hat{y}_{k_j}$). If the geometric information present between the two deployed nodes is larger than a threshold value, then an error is raised. The error is raised when the straight line segment ($x_{i_{j+1}} - x_{i_j}$, $y_{i_{j+1}} - y_{i_j}$) is mapped to ($\hat{x}_{k_{j+1}} - \hat{x}_{k_j}$, $\hat{y}_{k_{j+1}} - \hat{y}_{k_j}$), and the amount of geometric information present between the points ($\hat{x}_{k_{j+1}}, \hat{y}_{k_{j+1}}$) and ($\hat{x}_{k_j}, \hat{y}_{k_j}$) is greater than the predetermined threshold. In the present context, this means that an analysis of the first and second order derivatives between the aforementioned points is larger than a predetermined threshold. This might occur where a meandering curve is present between the aforementioned data points, which is not present in the user's behaviometric signature template 9.

Cusp Errors/Arc Deviation

In certain embodiments an arc deviation analysis is carried out, which comprises comparing the length of the signature curve joining successive nodes deployed on the provided signature, with the length of the signature curve joining successive nodes present on the one or more signatures provided during enrolment. This ratio may be expressed as $$\text{Min}_j\left(\frac{d_j}{\text{Arc}(\text{Curve}_{ij}, \text{Curve}_{1+ij}, \text{Curve}_{2+ij}, \ldots, \text{Curve}_{j+1})}\right) \quad \text{eq. 1.19}$$

where the following relationships hold $$dX_{curve\ ij+1} = X_{curve\ ij+1} - X_{curve\ ij}$$

$$dY_{curve\ ij+1} = Y_{curve\ ij+1} - Y_{curve\ ij}$$

$$d_j = \sqrt{dX_{curve_{ij+1}}^2 + dY_{curve_{ij+1}}^2}$$

If the ratio is less than a predetermined threshold value, then an error is raised during the validation process. The arc deviation analysis helps to identify statistical variations in the provided signature, which may be indicative of a fraudulent signature.

In certain embodiments during the enrolment process illustrated in FIG. 4, the provided signature displaying the greatest variance with the other four provided signatures is discarded and is not used to derive user biometric information for populating in the user's biometric signature template 9.

Customisable Security Policy

The method and system may also be used to implement a dynamic, customisable security policy, wherein the applied threshold values comprised in the user's behaviometric signature profile template 9, may be varied on the basis of a historical risk assessment of the user's preceding transactions. This may be achieved by monitoring and maintaining a record of historical transactions associated with a user's behaviometric signature profile template 9. This is explained in further detail below.

The risk assessment may comprise monitoring and calculating any one or more of the following characteristics:

User Consistency

The object of this characteristic is to determine how consistent the user is in reproducing their signature. This may be achieved by comparing a selection of previously provided signatures and analysing the statistical variances of the characterising node values deployed on each previously provided signature. In this way a mean statistical variance may be determined, and on the basis of which a consistency rating may then be defined. If the observed mean statistical variance is very small, then the user displays a high level of consistency in reproducing their signature, and the consistency rating will reflect this. Similarly, if the observed mean statistical variance is large, then the user displays a relatively low level of consistency in reproducing their signature, and the consistency rating will reflect this.

The behaviometric threshold values used during the validation process in order to determine if a provided signature is authentic, may be reduced for a user displaying a high degree of consistency, since it is expected, on the basis of the historical analysis, that such a user will be able to consistently reproduce their signature to a high level of accuracy.

Similarly, the behaviometric threshold values used during the validation process in order to determine if a provided signature is authentic, may be increased for a user displaying a low level of consistency, since it is expected, on the basis of the historical analysis, that such a user will not be able to consistently reproduce their signature to a high level of accuracy. Rather, it is expected that the provided signatures will display a high level of inconsistency, which may be reflected by a relatively large mean statistical variance observed between previously provided signatures.

The mean statistical variance may be determined by analysis of a plurality of previously provided signatures. For example, the historical analysis may comprise analysing all signatures provided over a preceding time period. For example, over the course of one year. Alternative time periods may also be used such as one or two weeks, or one or more years.

Alternatively, the historical analysis may compare a fixed number of previously provided signatures. For example, the five previously provided signatures may be analysed. The specific number of previously provided signatures may be selected based on the needs of the particular application.

In this way the consistency rating may be used to adapt and/or customise the specific behaviometric threshold values for the user, depending on how consistently they are able to reproduce their signature. One advantage of this approach is that the false reject rate is likely to be lowered. Furthermore, since a user's signature will tend to change over long time periods, for example over years, the behaviometric threshold values defined in a user's behaviometric signature profile template 9 may or may not remain consistent with the user's signature. In particular, a behaviometric signature profile template which adopts static behaviometric threshold values may become obsolete over time, in particular if the user's signature changes during that period of time.

Signature Complexity

The complexity of the signature may be analysed by looking at the velocity and associated acceleration vectors defined for each node. In particular, a complexity rating may be defined as $$\text{Signature Complexity} = \int_{t=0}^{T} R_1(V, \dot{V}) dt \quad \text{eq. 1.20}$$

$R_1$ is a measure of how the velocity changes along the provided signature and it effectively provides information regarding direction changes of the signature curve. $R_1$ is defined as $$\int_{t=0}^{T} \left( \left\| \frac{d}{dt}\left( \dot{V} - \frac{\dot{V} \cdot V}{V \cdot V} V \right) \right\| + \left\| \frac{d}{dt}\left( \frac{\dot{V} \cdot V}{V \cdot V} V \right) \right\| \right) dt;$$

where $V$ is the velocity vector; and $\dot{V}$ is the acceleration vector.

The signature complexity may be used to determine if the signature is sufficiently complex. In this context, complexity relates to geometrical complexity. For example, a straight line lacks complexity, whereas a curve having many different changes in gradient is likely to be geometrically complex. Accordingly, geometric complexity is proportional to slope (i.e. gradient), and therefore velocity and acceleration.

Where the calculated signature complexity value for a provided signature is less than a predetermined complexity threshold value, then the provided signature may be determined to lack the required complexity, and the signature validation may be refused. Alternatively, and dependent on the context within which the present method is implemented, a reduced or restricted level of access may be provided. For example, when the present signature verification method is used to control remote access to a bank account, a reduced level of access may comprise allowing the user to view their bank statements, but not allow the transfer of funds unless further security procedures are successfully passed. In general a signature lacking complexity may be more easily forged than a geometrically complex signature, and on this basis a policy decision may be made by the entity implementing the present method in order to determine what further security measures may be required for verifying the identity of a user having a signature lacking the required complexity.

In certain embodiments, when a signature is provided which lacks the required level of complexity, the user may be requested to re-enter a more complex version of their signature. For example, where the user has provided a signature comprising only the initials of the user's name, the provided signature may lack the required level of complexity. If this finding is subsequently confirmed by the complexity analysis, then the user may be required to provide a signature comprising their entire name for verification.

User Experience

This analysis may comprise reviewing a historical log associated with a particular user's behaviometric signature profile 9 to determine how often the user has provided their signature for verification. The more often a user uses the present method, the more accurate the user's behaviometric profile is likely to be, especially where the behaviometric thresholds are updated using historical user data. Thus experience may be indicative of how reliable the behaviometric thresholds are for the purposes of verifying a user's identity. This observation may have a bearing on the level of services offered to a specific user by the entity implementing the present method. For example, a user associated with a high experience rating may be provided with more access to different services on the basis of a verified signature, compared to a user having a low experience rating.

Returning to the example of a bank, where the present signature verification method is used to access a user's bank account, a user associated with a high experience rating may be provided with access to funds transfer services, whereas a use associated with a low experience rating may only be provided with access to account statements.

Security Alert Logging

In certain embodiments a log may be maintained for each user, which log maintains records of any previously raised security alerts. For example, a record of any failed verification results raised in respect of any previously provided signature. On the basis of this log, the behaviometric threshold values may be amended to improve security. For example, if a particular user's account has witnessed a high number of failed signature verification results over a predetermined period of time, then the behaviometric thresholds may be reduced to decrease the likelihood of a fraudulent user generating a false positive signature verification result. In other words, a user account which has witnessed a relatively high number of failed verification results may be flagged as a high risk user account and the behaviometric threshold values amended accordingly, to decrease the likelihood of a fraudulent user deceiving the present system.

Likewise, the log may also comprise a record of all successfully passed verification results, in which case this may be used as an indicator of how accurate the behaviometric tolerance threshold values comprised in the user's behaviometric signature profile template 9 are. For example, if a user's log indicates that a large number of successful signature verification events have occurred, then this may be indicative that the behaviometric information comprised in the user's behaviometric signature template 9, comprising the tolerance thresholds, accurately represent the user. In this way, a security rating may be associated with the specific user's behaviometric signature profile. A service provider, for example a financial entity, may then tailor the available services to the user on the basis of the associated security rating. For example, the financial entity may allow a user whose behaviometric signature template 9 is associated with a high security rating to effect large value transactions without requiring any further form of identity verification. In contrast, a user whose behaviometric signature template 9 is associated with a low security rating may be restricted to only low value transactions.

In accordance with this aspect, a recently enrolled user's behaviometric signature template 9 is likely to be associated with a low security rating, which will increase as the number of successful verifications increases.

This embodiment is well suited for use with dynamic behaviometric tolerance thresholds, which are fine-tuned in time on the basis of a historical analysis of the observed statistical variances displayed by signatures previously provided over a predetermined time period for example, over the course of the preceding year.

ADDITIONAL EMBODIMENTS

In certain embodiments, the device 3 for receiving the signature may relate to an electronic processing device such as a computer comprising a touch screen, a touch-screen enabled smartphone, or any other electronic device comprising a touch screen. In such embodiments, the functionality of the display device 5 and the signature entry device 3 may be provided by the same physical apparatus. Similarly, the electronic device, be it a computer or a touch screen enabled smartphone, may also be used during signature validation. In other words, a user's biometric signature may be verified using a user's existing electronic devices.

Alternatively, the device 3 for receiving the signature may relate to an image capture device such as a motion picture capture device (e.g. a camera), arranged to capture a sequence of images. In such embodiments, the signature may be provided by a user gesture, which gesture is captured by the image capture device. For example, the user may trace their signature via a gesture which is captured by the image capture device. The sequence of captured image frames are then analysed in order to determine the user's signature. The remaining signature analysis may be substantially as described in the receding description. However, in such aspects the image capture device may be arranged to capture three-dimensional spatial coordinate values. Thus, any relative change of the distance of the users hand and/or fingers in a plane perpendicular to the capture plane of the image capture device may also be captured. The image capture device may be arranged to track relative coordinate positions along any one of three orthogonal axis x (e.g. horizontal axis), y (e.g. vertical axis) and z (e.g. depth axis) relative to the image capture device. This can help to identify pen_up events (e.g. gaps in the signature curve) in the signature. When tracing their signature via a gesture, the user is likely to mimic the hand movements that they would normally reproduce using conventional pen and paper to sign their signature, in a plane which is substantially parallel to the image capture plane. Every signature gap, for example the gap between the stem of the letter 'i' 54 and its dot 54a (see FIG. 5) may be associated with a relative displacement of the hand in a plane oriented substantially normal to the image capture plane, which is akin to the hand gesture associated with the act of lifting the pen from paper. In this way, a hand/finger gesture associated with a signature may be captured, and gaps in the signature curve readily identified.

The present invention may be used as a security means to control unauthorised use of weapons, such as a handgun. For example, the handgun may comprise a signature entry device arranged to receive an authorised user's signature. The handgun may be configured with a secure local storage unit comprising the authorised user's behaviometric template. In order to operate the handgun, entry of an authorised signature is required. In order to achieve this, the handgun may be configured with an electronic and/or mechanical circuit arranged to prevent operation of the handgun until a valid signature has been provided in the signature entry device. The validity of the provided signature may be verified using the afore-described method. The enrolment process may be carried out at the point of sale.

The present invention may also be used to control access to a vehicle. In place or in addition to the conventional key and lock, the vehicle may comprise a device suitable for receiving a signature and a verification device arranged to verify the authenticity of a provided signature.

The system and method may be used to control access to a secure resource and/or entity, e.g., to a safe comprising valuable items, or to a secure facility.

Whilst many of the foregoing examples of the invention have been described within the context of determining the authenticity of a provided signature comprising a stylized script of letters representative of a person's name, the system and method may be used to also verify other user generated symbols and/or patterns. By way of example, this may comprise verifying the manner in which a user traces a pattern on a touchpad and/or on a touchscreen. Where the patterns are traced on a touchpad, the pattern may be invisible as it is being generated (e.g. a person may use a touchpad, in which there is no separate display arranged to display the pattern as it is being generated). Alternatively, a touch-sensitive screen may be used, such that the pattern may be displayed on the screen as it is being generated. The user generated pattern may then be verified in substantially the same manner as described in the preceding description, albeit in this instance the user's behaviometric signature template 9 may relate instead to a user's behaviometric pattern template. Accordingly, it is to be appreciated that within the present context, a signature may relate to any user generated indicia.

The present invention may be used to authorise an online transaction via an intermediate payment authority, such as PayPal™. For example, a user wishing to initiate a transaction with an e-commerce entity, such as an online retailer (e.g. Amazon.com™), may nominate to execute the transaction using PayPal™. At the transaction confirmation stage, the user may be required to provide their signature in order to complete the transaction, which provided signature may be verified using the method and/or system of the present invention.

While many of the foregoing components and steps relate to increasing the accuracy of signature verification, these steps will not be applicable or necessary in all circumstances. In that regard, many applications will not require a variety of the foregoing components and steps in order to each commercially acceptable levels of accurate verification.

The herein described embodiments are provided for by way of example only, and are not limiting. It will be understood that the present invention may be implemented in a myriad of different applications where identification verification is required, and such applications fall within the scope of the present invention. In that regard, references herein to requirements and aspects of "the present invention" are not intended, and depending on the context will not, refer to requirements and aspects that are present in the subject matter defined by any particular claim. In other words, each claim is defined by the limitations in the claim and is not limited by the particular examples set forth in this detailed description. It will also be understood that the embodiments described may be used individually or in combination, and such alternatives fall within the present scope.

The invention claimed is:

1. A method comprising:
receiving a set of sampled data points, each sampled data point being associated with a different position along a signature;
identifying a subset of nodes within the set of sampled data points using a set of predetermined nodes of a user profile;
identifying, with a processor, nodes of the user profile that correlate with nodes of the subset based on optimization matching;
determining if each identified node of the subset lies within a predetermined threshold range of a corresponding predetermined node;
calculating an acceleration value and a velocity value associated with line segments present between adjacent sampled data points comprised in the set of sampled data points;
defining a geometrical complexity rating of the provided signature on the basis of the calculated acceleration value and the calculated velocity value;
generating a positive verification when the nodes of the subset lie within the predetermined threshold range; and
rejecting the received signature when the defined geometrical complexity rating is below a minimum predetermined required geometrical complexity rating threshold,
wherein each sampled data point associated with a visible portion of the signature and each node of the subset is represented by a vector comprising a time coordinate and a spatial component, the spatial component being indicative of a relative position of the vector along the signature.

2. The method of claim 1, wherein each sampled data point is associated with a time coordinate value, and the said receiving comprises for each sampled data point:
calculating a time interval between the sampled data point and an adjacently located sampled data point, by comparing the time coordinate values associated with respectively the sampled data point and the adjacently located sampled data point;
determining if the time interval lies within a predetermined time interval threshold value; and
interpolating the position and time coordinate of one or more further data points located between the sampled data point and the adjacently located sampled data point when the calculated time interval exceeds the predetermined time interval threshold value, the interpolated position being selected such that the time interval between the sampled data point and the interpolated time coordinate associated with the one or more further data points lies within the predetermined time interval threshold value.

3. The method of claim 1, wherein receiving comprises:
calculating a distance of separation between a sampled data point and an adjacently located sampled data point;

determining if the distance of separation between the sampled data point and the adjacently located sampled data point lies within a predetermined distance interval threshold value; and interpolating the position of one or more further data points located between the sampled data point and the adjacently located sampled data point, when the calculated distance of separation exceeds the predetermined distance interval threshold value, such that the distance of separation between the sampled and the interpolated position associated with the one or more further data points lies within the predetermined distance interval threshold value.

4. The method of claim 1, wherein the optimization matching comprises:
  selecting a first predetermined node from the set of predetermined nodes;
  calculating a vector dot product value between the selected first predetermined node and each sampled data point comprised within the set of sampled data points;
  identifying the sampled data point associated with the largest vector dot product value as the data point that is most correlated with the first predetermined node, and designing the sampled data point based on such identification.

5. The method of claim 4, wherein the most correlated sampled data point is the data point which is oriented in substantially the same direction as the predetermined node, such that an angle of divergence $\theta_j$ between the two vectors associated with respectively the predetermined node and the sampled data point is minimised.

6. The method of claim 1, wherein the optimization matching comprises using a matching function $M_j$ to identify the sampled data point which is most correlated with the predetermined node, the matching function being a function of three differentiable functions $F(\theta_j)$, $G(d_j,d_{j+1})$, and $Q(r_j*d_j)$, where the following definitions apply:
  $\theta_j$ is the angle formed between the vector associated with the predetermined node and the vector associated with the sampled data point;
  $r_j$ is the scalar component of the vector associated with the predetermined node;
  $d_j$ is the scalar component of the vector associated with the sampled data point;
  $d_{j+1}$ is the scalar component of the vector associated with an adjacent sampled data point;
  $F(\theta_j)$ and $G(d_j,d_{j+1})$ are positive and have an upper positive value; and
  $Q(r_j*d_j)$ is a convex function selected such that whilst it is monotonically increasing, its derivative monotonically decreases to zero.

7. The method of claim 6, wherein the matching function $M_j$ is proportional to the product of the functions $F(\theta_j)$, $G(d_j,d_{j+1})$, and $Q(r_j*d_j)$, such that $$M_j = F(\theta_j)*G(d_j,d_{j+1})*Q(r_j*d_j).$$

8. The method of claim 1 further comprising:
  selecting a first one of the identified nodes of the subset;
  calculating a geometric relationship of the selected first node with respect to one or more adjacently located identified nodes; and wherein
  said determining comprises verifying if each calculated geometric relationship lies within a predetermined threshold value range comprised in the pre-stored user profile; and wherein
  a positive verification result is generated when one or more calculated geometric relationships lie within the predetermined threshold value range.

9. The method of claim 8, wherein the geometric relationship is calculated between the identified node and each one of two adjacent, sequentially-located identified nodes, in order to define two different geometric relationships associated with the identified node.

10. The method of claim 9, wherein the geometric relationship is calculated between the identified node and each one of seven adjacent, sequentially-located identified nodes, in order to define seven different geometric relationships associated with the identified node.

11. The method of claim 9, wherein the number of identified nodes m is less than or equal to half the number of sampled data points n:

$$m \le \frac{n}{2}$$

12. The method of claim 9, wherein the number of identified nodes m is less than or equal to a quarter the number of sampled data points n:

$$m \le \frac{n}{4}$$

13. The method of claim 1 further comprising sampling the provided signature with a variable sampling rate, such that at least a portion of the sampled data points comprised in the set of received sampled data points are associated with different sampling rates.

14. The method of claim 1, wherein the method comprises:
  generating a hash value on the basis of the set of sampled data points;
  comparing the generated hash value with a set of pre-stored hash values to determine if the generated hash value is unique; and wherein
  a positive verification result is generated when the generated hash value is unique.

15. The method of claim 14, wherein sampling comprises normalising the provided signature.

16. The method of claim 1, wherein the method further comprises:
  calculating a lapsed time interval between each identified node;
  determining if the calculated time lapse value lies within a predetermined threshold value range associated with the pre-stored user profile; and
  generating the positive verification result when the calculated time lapse value lies within the predetermined threshold value range.

17. The method of claim 1 further comprising:
  calculating a velocity vector for each identified node, using spatial coordinates and a temporal coordinate associated with each node;
  determining if each calculated velocity vector lies within a predetermined threshold value range comprised in the pre-stored user profile; and
  generating the positive verification result when the calculated velocity vectors lie within the predetermined threshold value range.

18. The method of claim 1 further comprising:
  calculating an acceleration vector for each identified node, using spatial coordinates and a temporal coordinate associated with each identified node;

determining if each calculated acceleration vector lies within a predetermined threshold value range comprised in the pre-stored user profile; and generating the positive verification result when the calculated acceleration vectors lie within the predetermined threshold value range.

19. The method of claim 1 comprising:

maintaining a record of node values that resulted in positive verification results, the node values being associated with a plurality of different received sets of sampled data points associated with different copies of the same signature;

calculating a statistical variance between the node values and the corresponding predetermined nodes for each different provided copy of the same signature; and amending the predetermined threshold value range of the corresponding predetermined node to be consistent with the calculated statistical variance.

20. The method of claim 19, wherein the statistical variance is calculated using node values that resulted in positive verification results associated with different copies of the same signature provided over the course of a time period.

21. The method of claim 1 further comprising authorizing a transaction between two remotely located entities based on said positive verification.

22. A system for verifying the authenticity of a provided signature, the system comprising:

an input device arranged to receive a set of sampled data points, each sampled data point being associated with a different position along the signature;

a processor;

instructions accessible and executable by the processor, said instructions comprising:

identifying a set of characterising nodes within the set of sampled data points using a set of predetermined characterising nodes comprised in a pre-stored user profile; determining if each identified characterising node lies within a predetermined threshold value range of a corresponding predetermined characterising node;

calculating first order and second order derivatives associated with line segments present between adjacent sampled data points comprised in the set of sampled data points;

defining a geometrical complexity rating of the provided signature on the basis of the calculated first and second order derivatives;

rejecting the received signature when the defined geometrical complexity rating is below a minimum predetermined required geometrical complexity rating threshold; and generating a positive verification result when the characterising nodes lie within the predetermined threshold value range, wherein each sampled data point associated with a visible portion of the signature and each node of the subset is represented by a vector comprising a time coordinate and a spatial component, the spatial component being indicative of a relative position of the vector along the signature.

23. The system of claim 22, wherein the instructions further comprise obtaining the set of predetermined characterising nodes comprised in the pre-stored user profile, and identifying the sampled data point which is most correlated with each predetermined characterising node from the set of sampled data points, using optimization matching.

24. The system of claim 23, wherein the instructions further comprise:

selecting a first predetermined characterising node from the set of predetermined characterising nodes;

calculating a vector dot product value between the selected first predetermined characterising node and each sampled data point comprised within the set of sampled data points; and identifying the sampled data point associated with the largest vector dot product value as the data point that is most correlated with the first predetermined characterising node and designating the sampled data point as a characterising node comprised within the set of identified characterising nodes.

25. The system of claim 24, wherein the instructions further comprise identifying the most correlated sampled data point as the data point which is oriented in substantially the same direction as the predetermined characterising node, such that an angle of divergence $\theta_j$ between the two vectors associated with respectively the characterising node and the sampled data point is minimised.

26. The system of claim 25, wherein the instructions further comprise using a matching function $M_j$ to identify the sampled data point which is most correlated with the predetermined characterising node, the matching function being a function of three differentiable functions $F(\theta_j)$, $G(d_j,d_{j+1})$, and $Q(r_j*d_j)$, where the following definitions apply:

$\theta_j$ is the angle formed between the vector associated with the predetermined characterising node and the vector associated with the sampled data point;

$r_j$ is the scalar component of the vector associated with the predetermined characterising node;

$d_j$ is the scalar component of the vector associated with the sampled data point;

$d_{j+1}$ is the scalar component of the vector associated with an adjacent sampled data point;

$F(\theta_j)$ and $G(d_j,d_{j+1})$ are positive and have an upper positive value; and $Q(r_j*d_j)$ is a convex function selected such that whilst it is monotonically increasing, its derivative monotonically decreases to zero.

27. The system of claim 26, wherein the matching function $M_j$ is proportional to the product of the functions $F(\theta_j)$, $G(d_j, d_{j+1})$ and $Q(r_j*d_j)$, such that $M_j=F(\theta_j)*G(d_j,d_{j+1})*Q(r_j*d_j)$.

28. The system of claim 22 further comprising an interpolator operatively coupled to the input device, and arranged to interpolate one or more data points.

29. The system of claim 28, wherein the input device is arranged to calculate a time interval between a sampled data point and an adjacently located sampled data point, by comparing a time coordinate value associated with respectively the sampled data point and the adjacently located sampled data point, and determine if the time interval lies within a predetermined time interval threshold value; and the interpolator is arranged to interpolate the position and time coordinate of one or more further data points located between the sampled data point and the adjacently located sampled data point when the calculated time interval exceeds the predetermined time interval threshold value, the interpolator being arranged to interpolate the interpolated position such that the time interval between the sampled data point and the interpolated time coordinate associated with the one or more further data points lies within the predetermined time interval threshold value.

30. The system of claim 29, wherein the input device is arranged to calculate a distance of separation between a sampled data point and an adjacently located sampled data point, determine if the distance of separation between the sampled data point and the adjacently located sampled data point lies within a predetermined distance interval threshold value; and the interpolator is arranged to interpolate the position of one or more further data points located between the sampled data point and the adjacently located sampled data point, when the calculated distance of separation exceeds the predetermined distance interval threshold value, such that the distance of separation between the sampled and the interpolated position associated with the one or more further data points lies within the predetermined distance interval threshold value.

31. The system of claim 22, wherein the instructions further comprise selecting a first one of the identified characterising nodes, calculating a geometric relationship of the selected first node with respect to one or more adjacently located identified characterising nodes, determining if each calculated geometric relationship lies within a predetermined threshold value range comprised in the pre-stored user profile, and generating a positive verification result when one or more calculated geometric relationships lie within the predetermined threshold value range.

32. The system of claim 22 further comprising:
a sampling device operatively coupled to the input device, the sampling device being arranged to sample the provided signature with a variable sampling rate, such that at least a portion of the sampled data points comprised in the set of sampled data points received by the input device are associated with different sampling rates.

33. The system of claim 32, wherein the sampling device is arranged to generate a hash value on the basis of the set of sampled data points; and
the instructions further comprising comparing the generated hash value with a set of pre-stored hash values to determine if the generated hash value is unique, and generating a positive verification result when the generated hash value is unique.

34. The system of claim 32, wherein the sampling device is arranged to normalise the provided signature.

35. The system of claim 22, wherein the input device and the processor are remote to each other.

36. The system of claim 35, wherein the processor is at a server located remotely to the input, and the server is operatively coupled to the input via a communication channel.

37. The system of claim 35, wherein the input device comprises a touch-pad arranged to receive a signature.

38. The system of claim 35, wherein the input device comprises a mobile telephone provided with a touch-sensitive screen.

39. The system of claim 35, wherein the input device comprises a personal computer.

40. The system of claim 35, wherein the input device comprises a tablet computer.

41. The system of claim 22, the instructions further comprise controlling access to a secure resource.

42. The system of claim 41, wherein the secure resource is a bank account.

43. The system of claim 41, wherein the secure resource is an automobile configured with a touch-pad arranged to receive the signature.

44. The system of claim 41, wherein the instructions further comprise controlling a transaction between two remotely located entities.

45. The system of claim 44, wherein the transaction is a financial transaction.

46. The system of claim 44, wherein the two remotely located entities comprise a payee and a recipient.

* * * * *